US00RE43226E

(19) United States
(12) Reissued Patent
Iazikov et al.

(10) Patent Number: US RE43,226 E
(45) Date of Reissued Patent: Mar. 6, 2012

(54) OPTICAL MULTIPLEXING DEVICE

(75) Inventors: Dmitri Iazikov, Springfield, OR (US); Thomas W. Mossberg, Eugene, OR (US); Christoph M. Greiner, Eugene, OR (US)

(73) Assignee: Steyphi Services DE LLC, Dover, DE (US)

(21) Appl. No.: 12/474,875

(22) Filed: May 29, 2009

Related U.S. Patent Documents

Reissue of:

(64) Patent No.: 7,224,855
Issued: May 29, 2007
Appl. No.: 10/740,194
Filed: Dec. 17, 2003

U.S. Applications:

(60) Provisional application No. 60/434,183, filed on Dec. 17, 2002.

(51) Int. Cl.

| | |
|---|---|
| ***G02B 6/12*** | (2006.01) |
| ***G02B 6/26*** | (2006.01) |
| ***G02B 6/10*** | (2006.01) |
| ***H04J 14/02*** | (2006.01) |

(52) U.S. Cl. ..... 385/14; 385/27; 385/31; 385/37; 385/39; 385/47; 385/49; 385/50; 385/129; 385/130; 385/131; 385/132; 398/83

(58) Field of Classification Search ..... 385/14, 385/27, 31, 37, 39, 47, 49, 50, 129–132; 398/83

See application file for complete search history.

(56) References Cited

U.S. PATENT DOCUMENTS

| | | | |
|---|---|---|---|
| 3,995,937 | A | 12/1976 | Baues et al. |
| 4,140,362 | A | 2/1979 | Tien |
| 4,387,955 | A | 6/1983 | Ludman et al. |
| 4,440,468 | A | 4/1984 | Auracher et al. |

(Continued)

FOREIGN PATENT DOCUMENTS

| | | | |
|---|---|---|---|
| EP | 0310438 | A1 | 4/1989 |

(Continued)

OTHER PUBLICATIONS

Mossberg, T.W., "Planar Holographic Optical Processing Devices", Optical Letters vol. 26 No. 7 pp. 414-416 Apr. 1, 2001.

(Continued)

*Primary Examiner* — Uyen Chau N Le
*Assistant Examiner* — Michael Mooney
(74) *Attorney, Agent, or Firm* — Schwabe, Williamson & Wyatt, P.C.

(57) ABSTRACT

An optical multiplexing device includes an optical element having at least one set of diffractive elements, and an optical reflector. The reflector routes, between first and second optical ports, that portion of an optical signal transmitted by the diffractive element set. The diffractive element set routes, between first and multiplexing optical ports, a portion of the optical signal that is diffracted by the diffractive element set. More complex optical multiplexing functionality(ies) may be achieved using additional sets of diffractive elements, in a common optical element (and possibly overlaid) or in separate optical elements with multiple reflectors. Separate multiplexing devices may be assembled with coupled ports for forming more complex devices. The respective portions of an optical signal transmitted by and reflected/diffracted from the diffractive element set typically differ spectrally. The portion reflected from the diffractive element set may comprise one or more channels of an optical WDM system.

73 Claims, 14 Drawing Sheets

U.S. PATENT DOCUMENTS

| | | | | |
|---|---|---|---|---|
| 4,660,934 | A | | 4/1987 | Akiba et al. |
| 4,740,951 | A | | 4/1988 | Lizet et al. |
| 4,743,083 | A | | 5/1988 | Schimpe |
| 4,746,186 | A | | 5/1988 | Nicia |
| 4,773,063 | A | | 9/1988 | Hunsperger et al. |
| 4,786,133 | A | | 11/1988 | Gidon et al. |
| 4,824,193 | A | | 4/1989 | Maeda et al. |
| 4,834,474 | A | | 5/1989 | George et al. |
| 4,923,271 | A | | 5/1990 | Henry et al. |
| 4,938,553 | A | | 7/1990 | Maerz et al. |
| 5,107,359 | A | | 4/1992 | Ohuchida |
| 5,195,161 | A | | 3/1993 | Adar et al. |
| 5,357,591 | A | | 10/1994 | Jiang et al. |
| 5,450,511 | A | | 9/1995 | Dragone |
| 5,768,450 | A | | 6/1998 | Bhagavatula |
| 5,812,318 | A | | 9/1998 | Babbitt et al. |
| 5,830,622 | A | | 11/1998 | Canning et al. |
| 5,917,625 | A | * | 6/1999 | Ogusu et al. ..... 385/24 |
| 6,011,884 | A | | 1/2000 | Dueck et al. |
| 6,011,885 | A | | 1/2000 | Dempewolf et al. |
| 6,137,933 | A | | 10/2000 | Hunter et al. |
| 6,144,480 | A | | 11/2000 | Li et al. |
| 6,169,613 | B1 | | 1/2001 | Amitai et al. |
| 6,473,232 | B2 | | 10/2002 | Ogawa |
| 6,678,429 | B2 | | 1/2004 | Mossberg et al. |
| 6,823,115 | B2 | | 11/2004 | Greiner et al. |
| 6,829,417 | B2 | | 12/2004 | Greiner et al. |
| 6,859,318 | B1 | | 2/2005 | Mossberg |
| 6,879,441 | B1 | | 4/2005 | Mossberg |
| 6,928,223 | B2 | | 8/2005 | Walpole et al. |
| 6,961,491 | B2 | | 11/2005 | Greiner et al. |
| 6,965,464 | B2 | | 11/2005 | Mossberg |
| 6,965,716 | B2 | | 11/2005 | Greiner et al. |
| 6,985,656 | B2 | | 1/2006 | Iazikov et al. |
| 6,987,911 | B2 | | 1/2006 | Mossberg et al. |
| 6,990,276 | B2 | | 1/2006 | Brice et al. |
| 6,993,223 | B2 | | 1/2006 | Greiner et al. |
| 7,009,743 | B2 | | 3/2006 | Mossberg |
| 7,062,128 | B2 | | 6/2006 | Mossberg |
| 7,116,453 | B2 | | 10/2006 | Mossberg |
| 7,116,852 | B2 | | 10/2006 | Tuda |
| 2003/0007202 | A1 | | 1/2003 | Moser et al. |
| 2003/0039444 | A1 | | 2/2003 | Mossberg et al. |
| 2003/0067645 | A1 | | 4/2003 | Ibsen et al. |
| 2003/0117677 | A1 | | 6/2003 | Mossberg |
| 2004/0076374 | A1 | | 4/2004 | Greiner et al. |
| 2004/0131360 | A1 | | 7/2004 | Iazikov et al. |
| 2004/0170356 | A1 | | 9/2004 | Iazikov et al. |
| 2004/0173680 | A1 | | 9/2004 | Mossberg et al. |
| 2004/0179779 | A1 | | 9/2004 | Greiner et al. |
| 2004/0208466 | A1 | | 10/2004 | Mossberg et al. |
| 2004/0258356 | A1 | | 12/2004 | Brice et al. |
| 2005/0018951 | A1 | | 1/2005 | Mossberg et al. |
| 2005/0078912 | A1 | | 4/2005 | Iazikov et al. |
| 2005/0135744 | A1 | | 6/2005 | Greiner et al. |
| 2005/0135745 | A1 | | 6/2005 | Greiner et al. |
| 2005/0135747 | A1 | | 6/2005 | Greiner et al. |
| 2005/0152011 | A1 | | 7/2005 | Mossberg |
| 2005/0163425 | A1 | | 7/2005 | Greiner et al. |
| 2006/0023280 | A1 | | 2/2006 | Mossberg |
| 2006/0177178 | A1 | | 8/2006 | Greiner et al. |
| 2006/0233493 | A1 | | 10/2006 | Mossberg |

FOREIGN PATENT DOCUMENTS

| | | | |
|---|---|---|---|
| GB | 2 68 215 | A | 6/1986 |
| GB | 2168215 | A1 | 6/1986 |
| WO | 9935523 | A1 | 7/1999 |
| WO | WO-99/35523 | A1 | 7/1999 |
| WO | 9956159 | A1 | 11/1999 |
| WO | WO-99/56159 | A1 | 11/1999 |
| WO | 02075411 | A1 | 9/2002 |
| WO | WO 02-075411 | | 9/2002 |

OTHER PUBLICATIONS

Mossberg, T.W., "Lithographic holography in planar waveguides", SPIE Holography Newsletter vol. 12 No. 2 Nov. 2001.

Capron et al., "Design and Performance of a Multiple Element Slab Waveguide Spectrograph for Multimode Fiber-Optic WDM System", Journal of Lightwave Technology vol. 11 No. 12 pp. 2009-2014 Dec. 1993.

Deri et al., "Quantitative Analysis of Integrated Optic Waveguide Spectrometers", IEEE Photonics Technology Letters vol. 6 No. 2 pp. 242-244 Feb. 1994.

Tang et al., "A Novel Wavelength-Division-Demultiplexer with Optical In-Plane to Surface-Normal Conversion", IEEE Photonics TechnologyLetters vol. 7 No. 8 pp. 908-910 Aug. 1995.

McGreer, "Diffraction from Concave Gratings in Planar Waveguides", IEEE Photonics Technology Letters vol. 7 No. 3 pp. 324-326 Mar. 1995.

McGreer, "Tunable Planar Concave Grating Demultiplexer", IEEE Photonics Technology Letters vol. 8 No. 4 pp. 551-553 Apr. 1996.

Day et al., "Filter-Response Line Shapes of Resonant Waveguide Gratings", Journal of Lightwave Technology vol. 14 No. 8 pp. 1815-1824 Aug. 1996.

Gini et al., "Polarization Independent InP WDM Multiplexer/Demultiplexer Module", Journal of Lightwave Technology vol. 16 No. 4 pp. 625-630 Apr. 1998.

Madsen et al., "Planar Waveguide Optical Spectrum Analyzer Using a UV-Induced Grating", IEEE Journal of Selected Topics in Quantum Electronics vol. 4 No. 6 pp. 925-929 Nov./Dec. 1998.

Paddon et al., "Simple Approach to Coupling in Textured Planar Waveguides", Optics Letters Vo. 23 No. 19 pp. 1529-1531 Oct. 1, 1998.

Grunnet-Jepsen et al., "Fibre Bragg Grating Based Spectral Encoder/Decoder for Ligthwave CDMA", Electronics Letters vol. 35 No. 13 pp. 1096-1097 Jun. 24, 1999.

Brady et al., "Holographic Interconnections in Photorefractive Waveguides", Applied Optics vol. 30 No. 17 pp. 2324-2333 Jun. 10, 1991.

Preston, Jr., "Digital Holographic Logic", Pattern Recognition vol. 5 pp. 37-49 1973.

Chen et al., "Ten Channel Single-Mode Wavelength Division Demultiplexer in Near IR", Integrated Optical Circuits vol. 1583 pp. 135-142 Sep. 1991.

Babbitt et al., "Spatial Routing of Optical Beams Through Time-Domain Spatial-Spectral Filtering", Optics Letters vol. 20 No. 8 pp. 910-912 Apr. 15, 1995.

Ura et al., "Integrated Optic Wavelength Demultiplexer Using a Coplanar Grating Lens", Applied Optics vol. 29 No. 9 pp. 1369-1373 Mar. 20, 1990.

Wiesmann et al., "Apodized Surface-Corrugated Gratings with Varying Duty Cycles", IEEE Photonics Technology Letters vol. 12 No. 6 pp. 639-641 Jun. 2000.

Miya, "Silica-Based Planar Lightwave Circuits: Passive and Thermally Active Devices", IEEE Journal of Selected Topics in Quantum Electronics vol. 6 No. 1 pp. 38-45 Jan./ Feb. 2000.

Backlund et al., "Multifunctional Grating Couples for Bidirectional Incoupling into Planar Waveguides", IEEE Photonics Technology Letters vol. 12 No. 3 pp. 314-316 Mar. 2000.

Minier et al., "Diffraction Characteristics of Superimposed Holographic Gratings in Planar Optical Waveguides", IEEE Photonics Technology Letters vol. 4 No. 10 pp. 1115-1117 Oct. 1992.

Chen et al., "Guided-Wave Planar Optical Interconnects Using Highly Multiplexed Polymer Waveguide Holograms", Journal of Lightwave Technology vol. 10 No. 7 pp. 888-897 Jul. 1992.

Eldada, "Dispersive Properties of Planar Polymer Bragg Gratings", IEEE Photonics Technology Letters vol. 12 No. 7 pp. 819-821 Jul. 2000.

Lohmann et al., "Graphics Codes for Computer Holography", Applied Optics vol. 34 No. 17 pp. 3172-3178 Jun. 10, 1995.

Hirayama et al., "Novel Surface Emitting Laser Diode Using Photonic Band-Gap Crystal Cavity", Applied Physics Letters vol. 69 No. 6 pp. 791-793 Aug. 5, 1996.

Wu et al., "Simplified Coupled Wave Equations for Cylindrical Waves in Circular Grating Planar Waveguides", Journal of Lightwave Technology vol. 10 No. 11 pp. 1575-1589 Nov. 1992.

Wang et al., "Wavelength-Division Multiplexing and Demultiplexing on Locally Sensitized Single-Mode Polymer Microstructure Waveguides", Optics Letter vol. 15 No. 7 pp. 363-365 Apr. 1, 1990.

Wang et al., "Five-Channel Polymer Waveguide Wavelength Division Demultiplexer for the Near Infrared", IEEE Photonics Technology Letters vol. 3 No. 1 pp. 36-38 Jan. 1991.
Cowin et al., "Compact Polymeric Wavelength Division Multiplexer", Electronics Letters vol. 35 No. 13 pp. 1074-1076 Jun. 24, 1999.
Soole et al., "High Speed Monolithic WDM Detector for 1.5 μm Fibre Band", Electronics Letters vol. 31 No. 15 pp. 1276-1277 Jul. 20, 1995.
Rantala et al., "Sol-Gel Hybrid Glass Diffractive Elements by Direct Electron-Beam Exposure", Electronics Letters vol. 34 No. 5 pp. 455-456 Mar. 5, 1998.
Li, "Analysis of Planar Waveguide Grating Couplers with Double Surface Corrugations of Identical Period", Optics Communications vol. 114 pp. 406-412 1995.
Magnusson et al., "New Principle for Optical Filters", Applied Physics Letters vol. 61 No. 9 pp. 1022-1024 Aug. 31, 1992.
Ojha et al., "Demonstration of Low Loss Integrated InGaAsP/InP Demultiplexer Device with Low Polarisation Sensitivity", Electronics Letters vol. 29 No. 9 pp. 805-806 Apr. 29, 1993.
Wang et al., "Theory and Applications of Guided-Mode Resonance Filters", Applied Optics vol. 32 No. 14 pp. 2606-2613 May 10, 1993.
Bates et al., "Gaussian Beams from Variable Groove Depth Grating Couplers in Planar Waveguides", Applied Optics vol. 32 No. 12 pp. 2112-2116 Apr. 20, 1993.
Brazas et al., "Analysis of Input-Grating Couplers Having Finite Lengths", Applied Optics vol. 34 No. 19 pp. 3786-3792 Jul. 1, 1995.
Song et al., "Focusing-Grating-Coupler Arrays for Uniform and Efficient Signal Distribution in a Backboard Optical Interconnect", Applied Optics vol. 34 No. 26 pp. 5913-5919 Sep. 10, 1995.
Henry et al., "Four-Channel Wavelength Division Multiplexers and Bandpass Filters Based on Elliptical Bragg Reflectors", Journal of Lightwave Technology vol. 8 No. 5 pp. 748-755 May 1990.
Koontz et al., "Preservation of Rectangular-Patterned InP Gratings Overgrown by Gas Source Molecular Beam Epitaxy", Applied Physics Letters vol. 71 No. 10 pp. 1400-1402 Sep. 8, 1997.
Sudbo et al., "Reflectivity of Integrated Optical Filters Based on Elliptic Bragg Reflectors", Journal of Lightwave Technology vol. 8 No. 6 pp. 998-1006 Jun. 1990.
Kurokawa et al., "Time-Space-Conversion Optical Signal Processing Using Arrayed-Waveguide Grating", Electronics Letters vol. 33 No. 22 pp. 1890-1891 Oct. 23, 1997.
Brigham et al., "Analysis of Scattering from Large Planar Gratings of Compliant Cylindrical Shells", Journal of the Accoustical Society of America vol. 61 No. 1 pp. 48-59 Jan. 1977.
Babbitt et al., "Optical Waveform Processing and Routing with Structured Surface Gratings", Optics Communications vol. 148 pp. 23-26 Mar. 1, 1998.
Grunnet-Jepsen et al., "Demonstration of All-Fiber Sparse Lightwave CDMA Based on Temporal Phase Encoding", Photonics Technology Letters vol. 11 No. 10 pp. 1283-1285 Oct. 1999.
Takenouchi et al., "Analysis of Optical-Signal Processing Using an Arrayed-Waveguide Grating", Optics Express vol. 6 No. 6 pp. 124-135 Mar. 13, 2000.
Fu et al., "1×8 Supergrating Wavelength-Division Demultiplexer in a Silica Planar Waveguide", Optics Letters vol. 22 No. 21 pp. 1627-1629 Nov. 1, 1997.
Alavie et al., "A Multiplexed Bragg Grating Fiber Laser Sensor System", IEEE Photonics Technology Letters vol. 5 No. 9 pp. 1112-1114 Sep. 1993.
Avrutsky et al. "Multiwavelength Diffraction and Apodization Using Binary Superimposed Gratings", IEEE Photonics Technology Letters vol. 10 No. 6 pp. 839-841 Jun. 1998.
Sun et al., "Demultiplexer with 120 Channels and 0.29-nm Channel Spacing", IEEE Photonics Technology Letters vol. 10 No. 1 pp. 90-92 Jan. 1998.
Kaneko et al., "Design and Applications of Silica-Based Planar Lightwave Circuits", IEEE Journal of Selected Topics in Quantum Electronics vol. 5 No. 5 pp. 1227-1236 Sep./Oct. 1999.
Tien et al., "Use of a Concentric-Arc Grating as a Thin-Film Spectrograph for Guided Waves", Applied Physics Letters vol. 37 No. 6 pp. 524-525 Sep. 15, 1980.
Canning et al., "Grating Structures with Phase mask Period in Silica-on-Silicon Planar Waveguides", Optics Communications vol. 171 pp. 213-217 Dec. 1, 1999.
Office Action for U.S. Appl. No. 10/740,194, mailed Apr. 20, 2006.
Office Action for U.S. Appl. No. 10/740,194, mailed Sep. 19, 2006.
Reasons for Allowance for U.S. Appl. No. 10/740,194, mailed Apr. 2, 2007.
International Search Report for PCT App. No. PCT/US2003/040420, Aug. 24, 004.
Brigham et al, Analysis of scattering from large planar gratings of compliant ctlindrical shells, J. Acoust. Soc. Am., vol. 61 No. 1 pp. 48-59 (Jan. 1977).
Ojha et al. Demonstration of low loss integrated InGaAsP/InP demultiplexer device with low polarisation sensitivity, Electron. Lett., vol. 29 No. 9 (Apr. 1993).
Tien et al, Use of concentric-arc grating as a thin-film spectrograph for guided waves, Am. Inst. of Physics (1980) pp. 524-525.
Minier et al, Diffraction characteristics of superimposed holographic gratings in planar optical waveguides, IEEE Photonics Tech. Lett., vol. 4 No. 10 (Oct. 1992).
Wiesman et al, IEEE Photonics Tech. Lett., vol. 12 No. 6 pp. 639-641 (Jun. 2000).
Ura et al, Integrated optical wavelength demultiplexer using a coplanar grating lens, Appl. Opt., vol. 29 No. 9 pp. 1369-1373 (Mar. 1990).
Chen et al, Ten channel single-mode wavelength division demultiplexer in the near IR, Integrated Optical Circuits, vol. 1583 pp. 134-142 (Intl. Soc. Opt. Eng., Boston, MA, USA, Sep. 1991).
Babbitt et al. Opt. Lett., vol. 20 No. 8 pp. 910-912 (Apr. 1995).
Mossberg, Opt. Lett., vol. 26 No. 7 pp. 414-416 (Apr. 2001).
Tang et al, A novel wavelength-division-demultiplexer with optical in-plane to surface-normal conversion, IEEE Photonics Tech. Lett., vol. 7 No. 8 (Aug. 1995).
Brady et al, Applied Optics, vol. 30 No. 17 p. 2324 (Jun. 1991).
Preston, "Digital holographic logic", Pattern Recognition, vol. 5, p. 37 (1973).
Hirayama et al, Applied Physics Letters, vol. 69 No. 6 (Aug. 5, 1996).
Lohmann et al, Applied Optics, vol. 34 No. 17 (Jun. 10, 1995).

* cited by examiner

OPTICAL MULTIPLEXING DEVICE

Matter enclosed in heavy brackets [ ] appears in the original patent but forms no part of this reissue specification; matter printed in italics indicates the additions made by reissue.

RELATED APPLICATIONS

This application claims benefit of prior-filed co-pending provisional App. No. 60/434,183 entitled "Optical Multiplexing device" filed Dec. 17, 2002 in the names of Dmitri Iazikov, Thomas W. Mossberg, and Christoph M. Greiner, said provisional application being hereby incorporated by reference as if fully set forth herein.

BACKGROUND

The field of the present invention relates to optical devices incorporating distributed optical structures. In particular, optical multiplexing devices are described herein which include distributed optical structures.

A variety of distributed optical structures (also referred to as holographic optical processors or photonic bandgap structures) are disclosed in:

U.S. non-provisional application Ser. No. 09/811,081 entitled "Holographic spectral filter" filed Mar. 16, 2001 (now U.S. Pat. No. 6,879,441), hereby incorporated by reference as if fully set forth herein;

U.S. non-provisional application Ser. No. 09/843,597 entitled "Optical processor" filed Apr. 26, 2001 (Pub. No. US 2003/0117677 A1: now Pat. No. 6,965,464), hereby incorporated by reference as if fully set forth herein;

U.S. non-provisional application Ser. No. 10/229,444 entitled "Amplitude and phase control in distributed optical structures" filed Aug. 27, 2002 (Pub. No. US 2003/0036444 A1;now U.S. Pat. No. 6,678,429), hereby incorporated by reference as if fully set forth herein;

U.S. non-provisional application Ser. No. 10/653,876 entitled "Amplitude and phase control in distributed optical structures" filed Sep. 02, 2003 (Pub. No. US 2004/0076374 A1; now U.S. Pat. No. 6,829,417), hereby incorporated by reference as if fully set forth herein; and U.S. provisional application Ser. No. 60/525,815 entitled "Methods and devices for combining of holographic Bragg reflectors in planar waveguides" filed Nov. 28, 2003, hereby incorporated by reference as if fully set forth herein.

Application Ser. No. 09/811,081 (U.S. Pat. No. 6,879,441) discloses that diffractive elements of a diffractive element set can be collectively arranged so as to exhibit a positional variation in amplitude, optical separation, or spatial phase over some portion of the set. The positional variation can determine at least in part a transfer function imparted on an optical signal routed between optical ports by the diffractive element set.

Application Ser. No. 10/229,444 (U.S. Pat. No. 6,678,429) and application Ser. No. 10/653,876 (U.S. Pat. No. 6,829,417) disclose the following. Each diffractive element of a diffractive element set can be spatially arranged relative to a corresponding diffractive element virtual contour and can comprise at least one diffracting region thereof. The diffracting regions have at least one altered optical property so as to enable diffraction of a portion of the incident optical field therefrom. Each diffractive element diffracts a corresponding diffracted component of an incident optical field with a corresponding diffractive element transfer function so that the diffractive element set collectively provides a set transfer function imparted on an optical signal routed between optical ports by the diffractive element set. The set transfer function or at least one corresponding diffractive element transfer function can be determined at least in part by: (A) a less-than-unity fill factor for the corresponding virtual contour, (B) a non-uniform spatial distribution of multiple diffracting regions along the corresponding virtual contour, (C) variation of a spatial profile of the optical property of at least one diffracting region of the corresponding virtual contour, (D) variation of a spatial profile of the optical property among multiple diffracting regions of the corresponding virtual contour, (E) variation of the spatial profile of the optical property of at least one diffracting region among elements of at least one diffractive element set, (F) longitudinal displacement of at least one diffractive element relative to the corresponding virtual contour, or (G) at least one virtual contour lacking a diffractive element corresponding thereto.

SUMMARY

An optical multiplexing device comprises: an optical element having at least one set of diffractive elements; and an optical reflector. The reflector routes, between a first optical port and a second optical port, that portion of an optical signal propagating within the optical element and transmitted by the diffractive element set. The diffractive element set routes, between the first optical port and a corresponding multiplexing optical port, a corresponding portion of the optical signal that is diffracted by the diffractive element set. If the first optical port is an input port and the second optical port is an output port, then the apparatus functions as a channel-dropping multiplexer, and the multiplexing optical port is a dropped-channel port. If the first optical port is an output port and the second optical port is an input port, then the apparatus functions as a channel-adding multiplexer, and the multiplexing optical port is an added-channel port. If the diffractive element set routes, between the second optical port and a corresponding second multiplexing optical port, a corresponding portion of the optical signal that is diffracted by the diffractive element set, the apparatus functions as an add/drop multiplexer.

The optical element may comprise a planar waveguide, and the diffractive elements may be curvilinear elements. The optical element may allow propagation therein in three dimensions, and the diffractive elements may comprise areal elements. The reflector and/or diffractive element set may comprise focusing element(s), and the optical ports may be located at corresponding conjugate image points. The optical ports may be coupled to optical waveguides, including channel waveguides and/or optical fibers. The reflector may be formed on or in the optical element, or may comprise a separate optical element. The reflector may be substantially achromatic over a design spectral window for the multiplexing device.

More complex optical multiplexing functionality(ies) may be achieved using additional sets of diffractive elements, in a common optical element (and possibly overlaid) or in separate optical elements with multiple reflectors. Separate multiplexing devices may be assembled with coupled ports for forming more complex devices.

The respective portions of an optical signal transmitted by and reflected/diffracted from the diffractive element set typically differ spectrally. The portion reflected from the diffractive element set may comprise at least one channel of an optical WDM system.

Objects and advantages pertaining to optical multiplexing devices may become apparent upon referring to the disclosed embodiments as illustrated in the drawings and disclosed in the following written description and/or claims.

Figure 1:
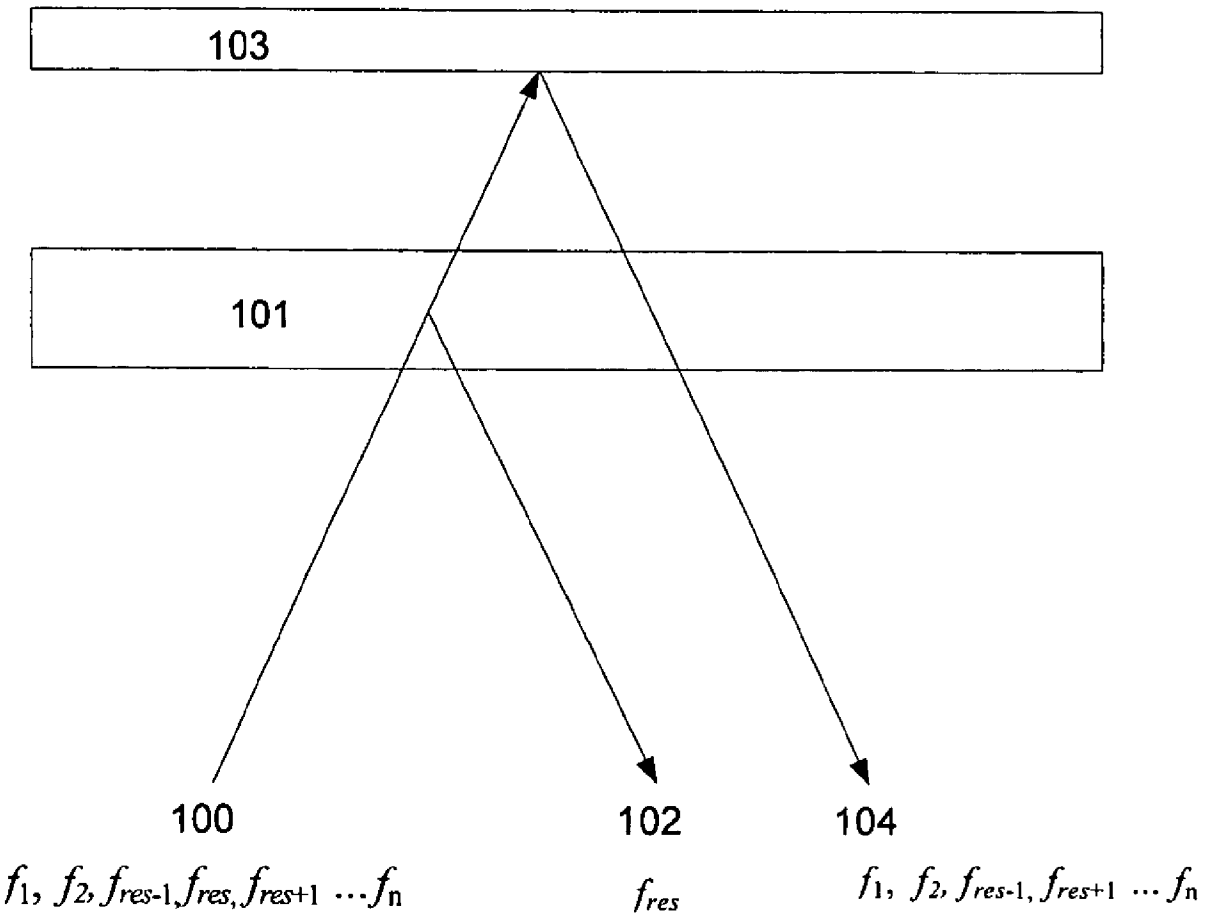
FIG. 1 is a schematic top view of an exemplary optical multiplexing device.

The schematics and embodiments shown in the Figures are exemplary, and should not be construed as limiting the scope of the present disclosure and/or appended claims.

DETAILED DESCRIPTION OF EMBODIMENTS

An optical multiplexing device, as disclosed and/or claimed herein, comprises an optical element with one or more sets of diffractive elements. Such a diffractive element set may also be equivalently referred to as a holographic optical processor (HOP) or a photonic bandgap structure, and may be implemented in a variety of ways, including but not limited to those described in the references incorporated hereinabove. The optical multiplexing device further comprises an optical reflector. The reflector routes, between a first optical port and a second optical port, that portion of an optical signal propagating within the optical element and transmitted by the diffractive element set. The first and second optical ports may also be referred to as broadband ports. The diffractive element set routes, between the first optical port and a corresponding multiplexing optical port, a corresponding portion of the optical signal that is diffracted by the diffractive element set. The multiplexing optical port may also be referred to as a narrowband port. The ports may or may not occupy the same physical space.

The optical element may comprise a planar optical waveguide, in which a propagating optical signal is substantially confined in one transverse dimension while propagating in the other two dimensions. Alternatively, the optical element may enable propagation therein in all three spatial dimensions. The optical ports may include or may be coupled to, without limitation, channel waveguides, edge mounted fibers, surface grating couplers, free space propagation, or any other suitable optical means to deliver an optical wave into an optical element and to receive light emerging from the optical element, and may be defined structurally and/or functionally.

An optical element in the form of a planar optical waveguide may comprise at least one core layer between a lower cladding layer and an upper cladding layer, the cladding layers having refractive indices sufficiently different from that of the core layer so as to provide substantial optical confinement in one transverse dimension. The core and cladding layers may be placed on a substrate for mechanical robustness and/or for other technical reasons, but in general a substrate is not required for optical functionality. The scope of the present disclosure and/or appended claims includes variations of this three-layer structure, including without limitation replacement of one or both cladding layers with vacuum, air, or other medium or structure providing substantial optical confinement for optical modes guided by the core layer. The present disclosure and/or appended claims shall also encompass, without limitation, apparatus to change isotropic and/or non-isotropic values of refractive indexes of one or more of the core layer and the cladding layers, using thermo-optical, electro-optical, non-linear optical, stress-optical, or other effects known in the art. Such controlled alteration of refractive index may be applied uniformly or spatially selectively, and may be employed to control wavelength-dependent properties of the diffractive element set, to control polarization-dependent properties of the diffractive element set, to reduce the temperature dependence of the optical properties/performance of the diffractive element set, and/or for other purposes. Control of the wavelength-dependent properties of a diffractive element set (such as shifting its resonance frequency, for example) may be achieved by applying mechanical stress to the optical element to change the spatial separation between the diffractive elements. The core and cladding layers may comprise any optically transmissive media with suitable optical properties, including without limitation silica glass, doped silica glass, other glasses, silicon, III-V semiconductors, other semiconductors, polymers, liquid crystals, combinations thereof, and/or functional equivalents thereof.

A diffractive element set (i.e., holographic optical processor or photonic bandgap structure) may be formed in the optical element (i.e., light transport structure) in all or part of any one or more of the core and cladding layers, by any suitable spatially-selective material processing technique(s), including but not limited to etching, lithography, stamping, molding, UV-exposure, other optical or electromagnetic exposure, electron beam techniques, inscribing, printing, other suitable means for spatially-selective material processing, combinations thereof, and/or functional equivalents thereof. The diffractive elements formed in a planar optical waveguide may typically comprise curvilinear elements, although other suitable configurations may be employed as well. Such curvilinear elements may be linear, arcuate, elliptical, parabolic, hyperbolic, general aspheric, and/or other shapes suitable for routing light between the optical ports. A focusing diffractive element set may be employed with the corresponding optical ports positioned at/near corresponding conjugate image points defined by the diffractive element set.

An optical element allowing propagation of an optical signal in three dimensions may be formed from any suitable optical material, and the diffractive element set may be formed by any suitable technique(s) for spatially-selective material processing (in three dimensions), including those listed hereinabove. The diffractive elements formed in such an element may typically comprise areal elements, although other suitable configurations may be employed as well.

The optical reflector may be integrally formed in and/or on the optical element with the diffractive element set, by any suitable technique(s) and in any suitable configuration. The optical reflector may comprise an additional set of diffractive elements formed in/on the optical element (equivalently, an additional holographic optical processor or photonic bandgap structure), and may be formed in any suitable manner, including those set forth hereinabove. The optical reflector may instead comprise a surface of the optical element, suitably shaped and (if needed or desired) with a suitable optical coating thereon. Such a reflective surface may be formed by any suitable technique(s), including but not limited to cutting, etching, lithography, dicing, scribing, molding, stamping, polishing, or otherwise shaping part of the surface of the optical element to the desired shape. Any suitable reflective coating may be applied to the shaped surface, suitable coatings including but not limited to gold, other metallic coatings, single-layer or multi-layer dielectric coatings, and other suitable reflective coatings. In some circumstances internal reflection at the surface may be relied on (total or otherwise) without a reflective coating. The optical reflector may instead be provided as an optical component separate from the optical element. It is within the scope of the present disclosure and/or appended claims to form the optical reflector using any suitable elements, components, and/or techniques, including without limitation those set forth hereinabove, combinations thereof, and/or functional equivalents thereof. It may be desirable under typical circumstance for the reflectivity of the optical reflector to be substantially wavelength independent over a designed spectral window for the optical multiplexing device, although the reflectivity may have any desired wavelength dependence while remaining within the scope of the present disclosure and/or appended claims. Shapes that may be employed for forming the reflective surface may include without limitation linear, arcuate, elliptical, parabolic, hyperbolic, general aspheric, and/or other shapes suitable for routing light between the first and second optical ports. A focusing optical reflector may be employed with the corresponding optical ports positioned at/near corresponding conjugate image points defined by the optical reflector.

Hereinafter follow a description of general schematics of the optical multiplexing device and then descriptions of specific embodiments of optical multiplexing devices. Designations of frequency bands used hereinafter are for illustration only and shall not be construed as limiting the scope of the disclosure and/or appended claims. FIGS. 1 to 4 are for illustration of general schematics only.

A schematic functional diagram of the basic multiplexing device when the light is injected into the input broadband port is presented in FIG. 1. The light comprising frequency bands $f_1, f_2 \ldots f_{res-1}, f_{res}, f_{res+1} \ldots f_n$ (equivalently, corresponding wavelength bands) is injected into the input broadband port (100) and impinges on holographic optical processor, or HOP, (101), which is designed so as to have a resonance frequency band $f_{res}$ and is also designed to route light between input broadband port (100) and narrowband port (102). HOP (101) reflects/diffracts and focuses light from input broadband port (100) in the selected frequency band $f_{res}$ into narrowband port (102) and transmits light outside of the selected frequency band. A substantially achromatic (over a designed spectral window) reflective surface (103) is designed to route light between input broadband port (100) and output broadband port (104), so that it reflects and focuses the light that has been transmitted through HOP (101) into the output broadband port (104). With the light (i.e., optical signal) entering through port 100, the device schematically depicted functions as a channel-dropping multiplexer.

Figure 2:
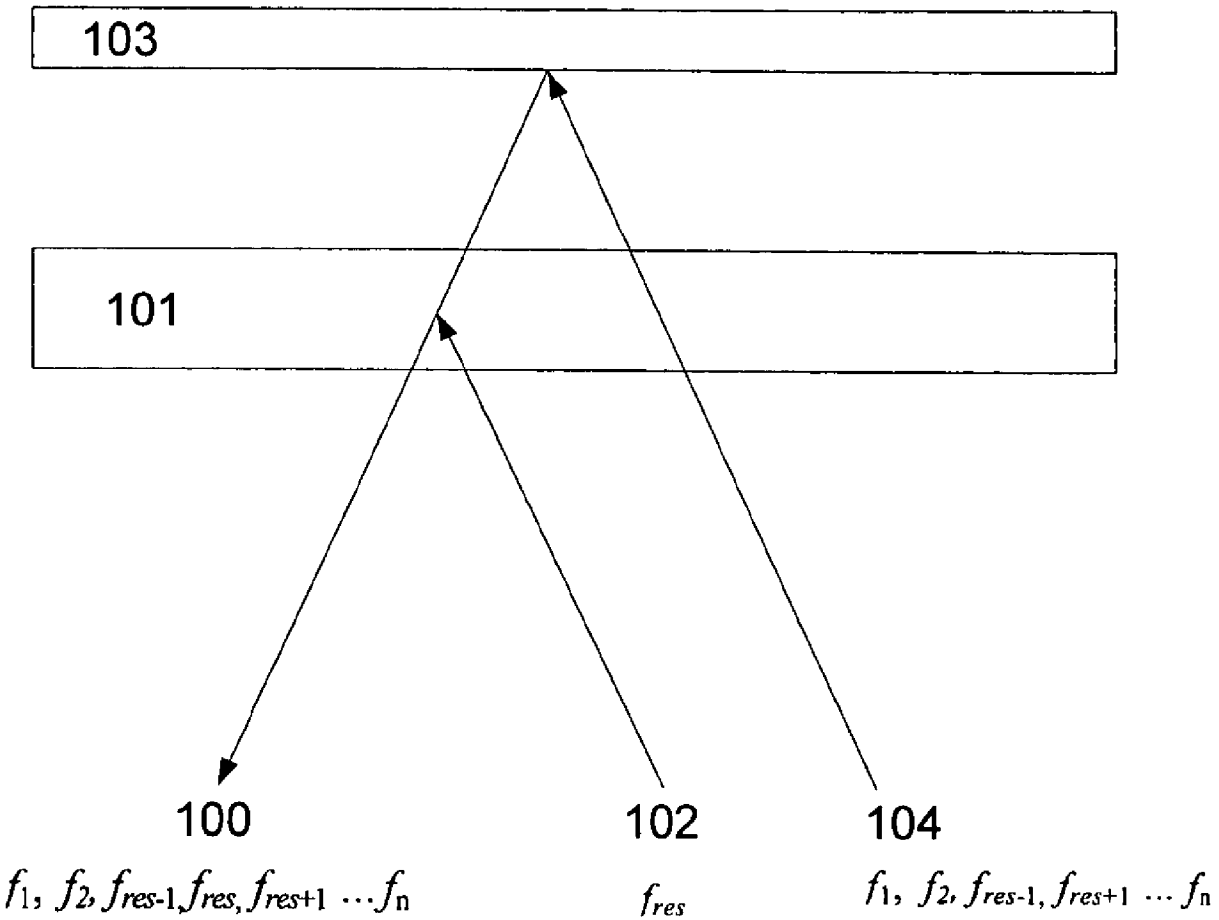
FIG. 2 is a schematic top view of an exemplary optical multiplexing device.

FIG. 2 is a schematic functional diagram of the same basic multiplexing device as in FIG. 1 using the same designations as used in FIG. 1, illustrating the reciprocal case when a broadband optical signal (in this example comprising frequency bands $f_1, f_2 \ldots f_{res-1}, f_{res+1} \ldots f_n$) is injected into the broadband port (104). The reflective achromatic surface (103) is reciprocal, so that it routes light from port (104) to port (100). Since the optical signal injected into port (104) does not include $f_{res}$, it will be transmitted through HOP (101) substantially unaffected. A narrow band optical signal comprising the frequency band $f_{res}$ injected into narrowband port (102) is routed by HOP (101) to port (100), since HOP (101) is reciprocal. The narrowband optical signal diffracted/reflected by HOP (101) and routed to broadband port (100) is combined with the broadband optical signal injected into port (104) and exits the device. The optical multiplexer schematically depicted in FIG. 2 functions as a channel-adding multiplexer.

In the descriptions of FIGS. 1 and 2, it is stated that HOP 101 reflects and routes signals within a single wavelength band $f_{res}$. This was for illustrative purposes only, and HOP 101 may be configured to diffract/reflect in multiple frequency bands simultaneously. Thus the dropped and/or added signals in devices as described herein may comprise a single wavelength/frequency band or multiple wavelength/frequency bands to suit application needs. It should be further noted in the case that multiple add/drop bands are employed, they need not be contiguous.

Figure 3:
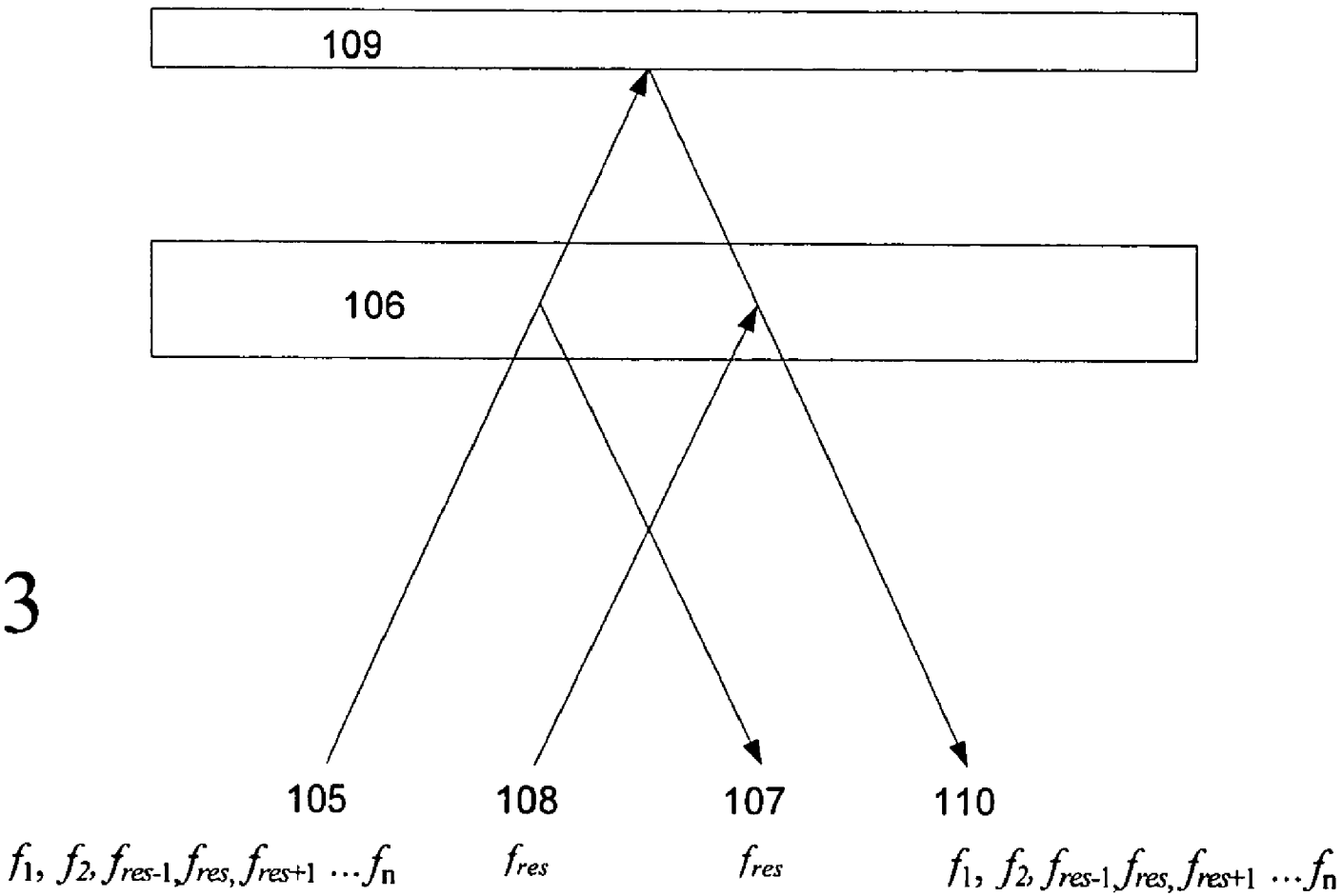
FIG. 3 is a schematic top view of an exemplary optical multiplexing device.
Figure 4:
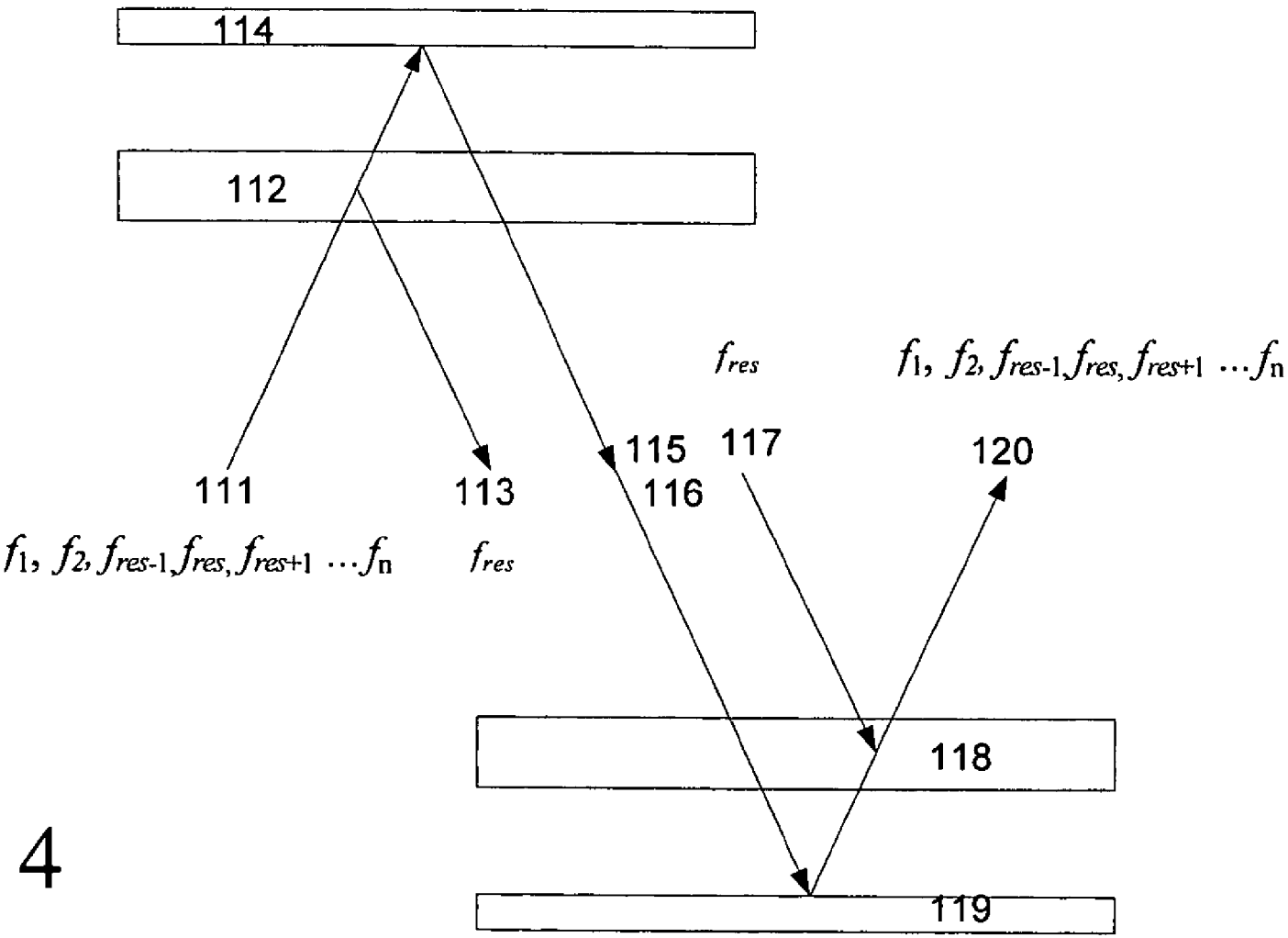
FIG. 4 is a schematic top view of an exemplary optical multiplexing device.

FIGS. 3 and 4 schematically illustrate more complex optical devices that may be constructed using the basic functions of adding a narrow frequency band into a broader frequency band and dropping a narrow frequency band from a broader frequency band. A schematic diagram of a multiplexing device that drops a frequency band and adds the same a frequency band (an optical add/drop multiplexer or OADM), which is particularly useful for telecommunication applications, is presented in FIG. 3. An input optical signal including frequency bands $f_1, f_2 \ldots f_{res-1}, f_{res}, f_{res+1} \ldots f_n$ is injected into the input broadband port (105) and impinges on HOP (106), which is designed so as to reflect/diffract light within a resonance frequency band $f_{res}$, and is also designed to route light between input broadband port (105) and drop narrowband port (107) and to route light between add narrowband port (108) and the output broadband port (110). The HOP reflects/diffracts light in the selected frequency band $f_{res}$ from port (105) to drop narrowband port (107), reflects light in the selected frequency band $f_{res}$ inserted from add narrowband port (108) to port (110), and passes light outside of band $f_{res}$. The substantially achromatic reflective surface (109) is designed to route light between input broadband port (105) and output broadband port (110), and directs light entering port (105) and transmitted through HOP (106) to port (110), where it exits the OADM device.

FIG. 4 illustrates how the OADM functionality illustrated in FIG. 3 may be achieved using a combination of the devices of FIGS. 1 and 2. The combination OADM device of FIG. 4 includes broadband ports 111, 115, 116 and 120, narrowband ports 113 and 117, HOP's 112 and 118, and optical reflectors 114 and 119. The two devices are positioned so that an optical signal exiting output broadband port 115 is received into input broadband port 116 (i.e., ports 115 and 116 are coupled). The device shown in FIG. 4 may be realized by fabricating both HOP's and both optical reflectors together with associated ports onto a single planar waveguide slab. In this case, the ports 115 and 116 may be virtual in the sense that light simply passes through a focus within the planar waveguide, however, when integrated onto a single planar waveguide, the light path shown extending from broadband reflector 114 through virtual ports 115 and 116 and to broadband reflector 119 need not pass through a focus. The signal beam may remain collimated or have other divergent properties as it passes from 114 to 119. It is only required that optical reflectors 114 and 119 acting together route light between optical ports 111 and 120 through HOP 112 and HOP 118.

It is to be understood that FIGS. 3 and 4 are exemplary, and that any number of HOP's, reflective surfaces, and/or optical ports may be combined to achieve any desired level of complexity of add and/or drop functionality(ies) while remaining within the scope of the present disclosure and/or appended claims. Further, it should be appreciated that such combinations may take the form of a single optical element with multiple HOP's, reflectors, and/or ports formed thereon, or may be realized by assembly of multiple multiplexing devices, each with at least one port aligned with a port of at least one other multiplexing device (i.e., the optical ports are coupled). If multiple HOP's are implemented in a common optical element, they may be overlaid, stacked, and/or interleaved in any suitable manner, including but not limited to those taught by U.S. application Ser. No. 10/229,444 (Pub. No. US 2003/0036444 A1), U.S. application Ser. No. 10/653,876, and/or U.S. provisional App. No. 60/525,815, each incorporated hereinabove.

FIGS. 5A, 5B, 6, and 7 illustrate an exemplary embodiment of an optical multiplexing device with substantially circular contours defining both the diffractive elements of the HOP as well as the optical reflector. While circular elements/reflectors are shown in these examples to facilitate understanding of the routing of optical signals between ports, it should be noted that elements/reflectors may be employed having various shapes or contours while falling within the scope of the present disclosure and/or appended claims. The exemplary embodiment may be modified within the scope and spirit of the present disclosure and/or appended claims in a variety of ways, including but not limited to: adding ports, adding reflectors, and/or adding HOP's to achieve more complex device functionality. Optical multiplexing devices within the scope of the present disclosure and/or appended claims may further include mechanism(s) for changing optical properties of the transmissive medium, thereby providing additional device functionality, including but not limited to dynamic and/or static change in the refractive indexes of waveguide layer(s) to obtain a tunable OADM and/or to control birefringence and/or to enhance thermal stability of the device.

Figure 5A:
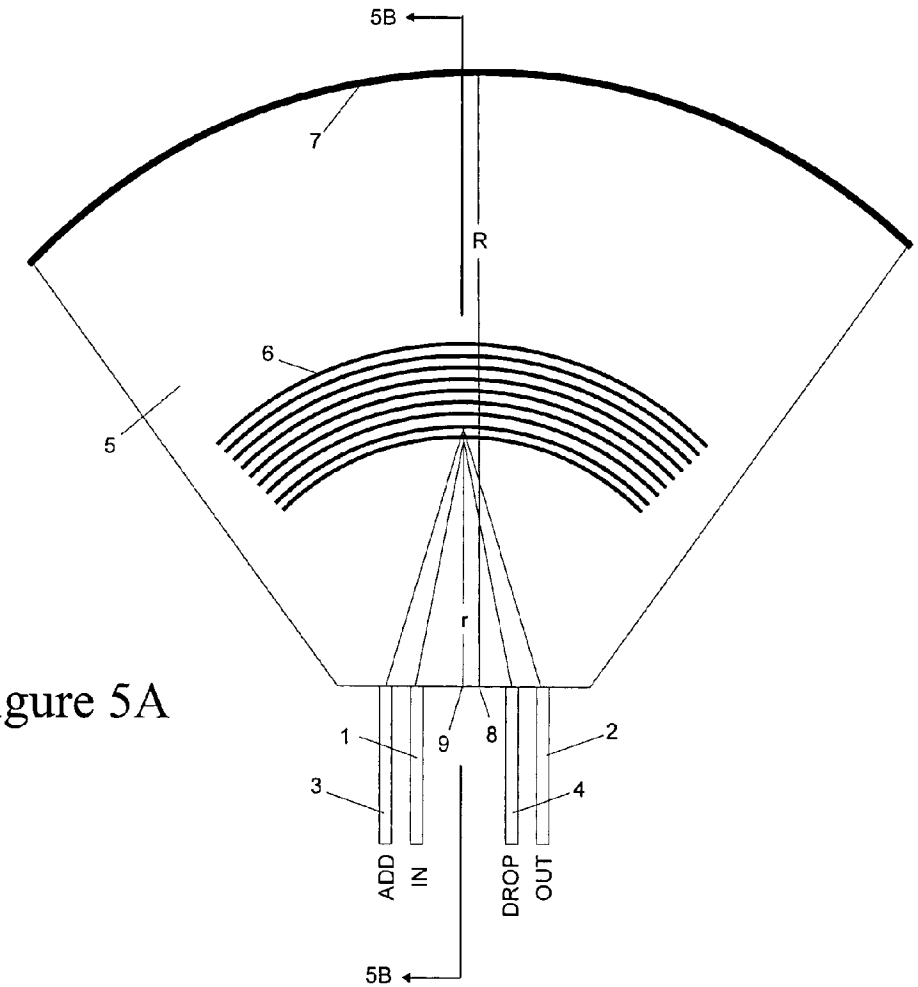
FIGS. 5A and 5B are top and cross-sectional views of an exemplary optical multiplexing device.

FIG. 5A illustrates an exemplary embodiment suitable for use as an OADM device and including an input waveguide (1), an output waveguide (2), an add waveguide (3), and a drop waveguide (4), each edge-coupled to a single-mode or multi-mode slab or planar waveguide (5). Planar waveguide (5) includes a HOP (6) formed therein, and a reflective surface (7) formed at the end of the slab waveguide. The reflective surface (7) is substantially circular with center of curvature (8). The diffractive elements of HOP (6) (which may also be referred to as diffractive element contours or simply diffractive contours) are implemented in the shape of circular arcs with a common center of curvature (9). The terms "coupling aperture" and "aperture" refer to the optical entry and/or exit portals formed by the junction of the input and output waveguides and the slab waveguide.

Figure 5B:
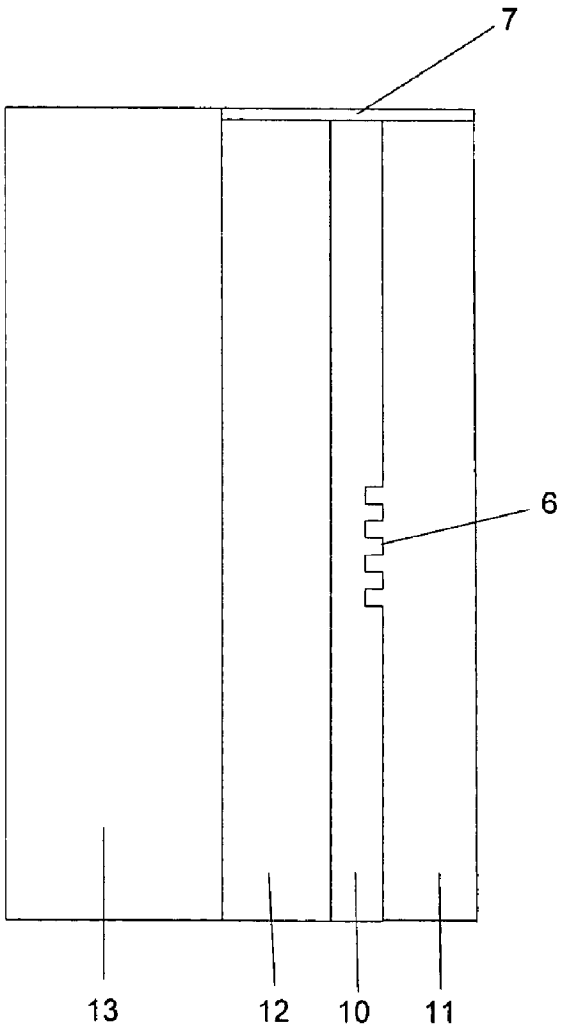

The cross-section view in FIG. 5B shows the layer structure of the OADM, in this example comprising at least one core layer (10) between lower cladding layer (12) and upper cladding layer (11), each cladding layer having refractive indices sufficiently different from that of the core layer so as to achieve substantial optical confinement. Core and cladding layers are on a substrate (13).

HOP (6) in the exemplary embodiment of FIGS. 5A and 5B is designed to simultaneously route resonant optical signals between: the aperture of the input waveguide (1) and the aperture of the drop waveguide (4); and the aperture of the add waveguide (3) and the aperture of the output waveguide (2). To achieve this, the HOP may comprise substantially concentric substantially circular arcs with square, rectangular, or other lithographically convenient cross-sections formed in one or more the layers (10), (11), and/or (12). The contour, width, fill factor, and/or other characteristics of the HOP diffractive elements may be optimized (if needed or desired) according to the teachings of U.S. application Ser. No. 10/229,444 (Pub. No. US 2003/0036444 A1) and/or U.S. application Ser. No. 10/653,876, each incorporated hereinabove. HOP apodization of arbitrary complexity may be employed. Waveguides (1), (2), (3), and (4) and the common center of curvature (9) of the HOP diffractive elements are positioned in such a manner that the center of curvature (9) substantially coincides with the midpoint between the coupling apertures of the input (1) and drop (4) waveguides, and at the same time substantially coincides with the midpoint between the coupling apertures of the add (3) and output (2) waveguides. It should be understood that circular geometry of the diffractive elements of HOP (6) is not optimal for optical coupling of the waveguides, and shapes of greater complexity for the diffractive elements of HOP (6) may be employed to improve optical performance to enable more arbitrary location of the coupling apertures of the waveguides. If insertion loss optimization is desired, the HOP may have such width and location to intersect all or most of the light radiated from the coupling apertures of waveguides (1) and (3), and waveguides (2) and (4) may be positioned at such angles to maximize the coupling between the waveguides and the light reflected from the HOP (6). The reflective bandwidth of the HOP may exhibit a small dependence on the relative placement of the center of curvature (9) and input port. This variation may be used to add and drop different bandwidths or may be constrained to insignificance by sufficiently reducing the spatial displacement between input ports and the center of curvature of the HOP. Note that more complex HOP structures provide separate add and drop bandwidths regardless of input/output port placement.

The reflecting surface (7) in the exemplary embodiment is a circular arc with radius R and a center of curvature (8) substantially coinciding with the midpoint between the coupling apertures of the input (1) and output (2) waveguides. If insertion loss optimization is desired, the reflecting surface (7) may have such width and location to intersect all or most of the light radiated from the coupling aperture of waveguide (1), and waveguide (2) may be positioned at such an angle to maximize the coupling between the waveguides and the light reflected from the reflective surface (which may be evaluated by operating port (2) as an input port).

Input ports may be configured so that light enters the optical element at various angles. Output ports may be configured to optimally couple to light exiting the optical element at various angles. Insertion loss may be minimized by orienting ports so that the output beam wavefront most optimally matches an optical mode supported by the corresponding output means (e.g., output waveguide). Dissimilarly sized input and output coupling apertures may be accommodated by appropriate adjustment of imaging conjugate ratio and hence imaging magnification.

Figure 6:
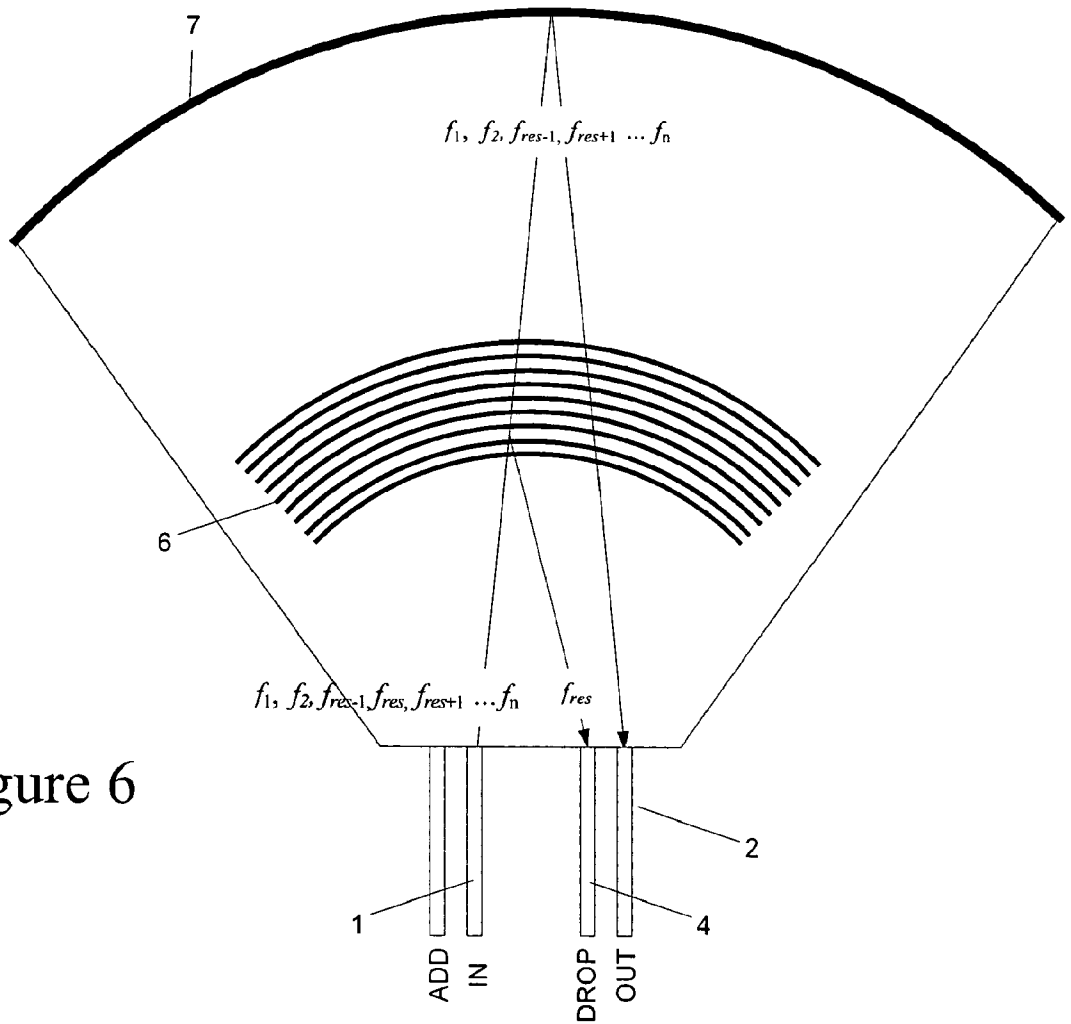
FIG. 6 is a top view of an exemplary optical multiplexing device.
Figure 7:
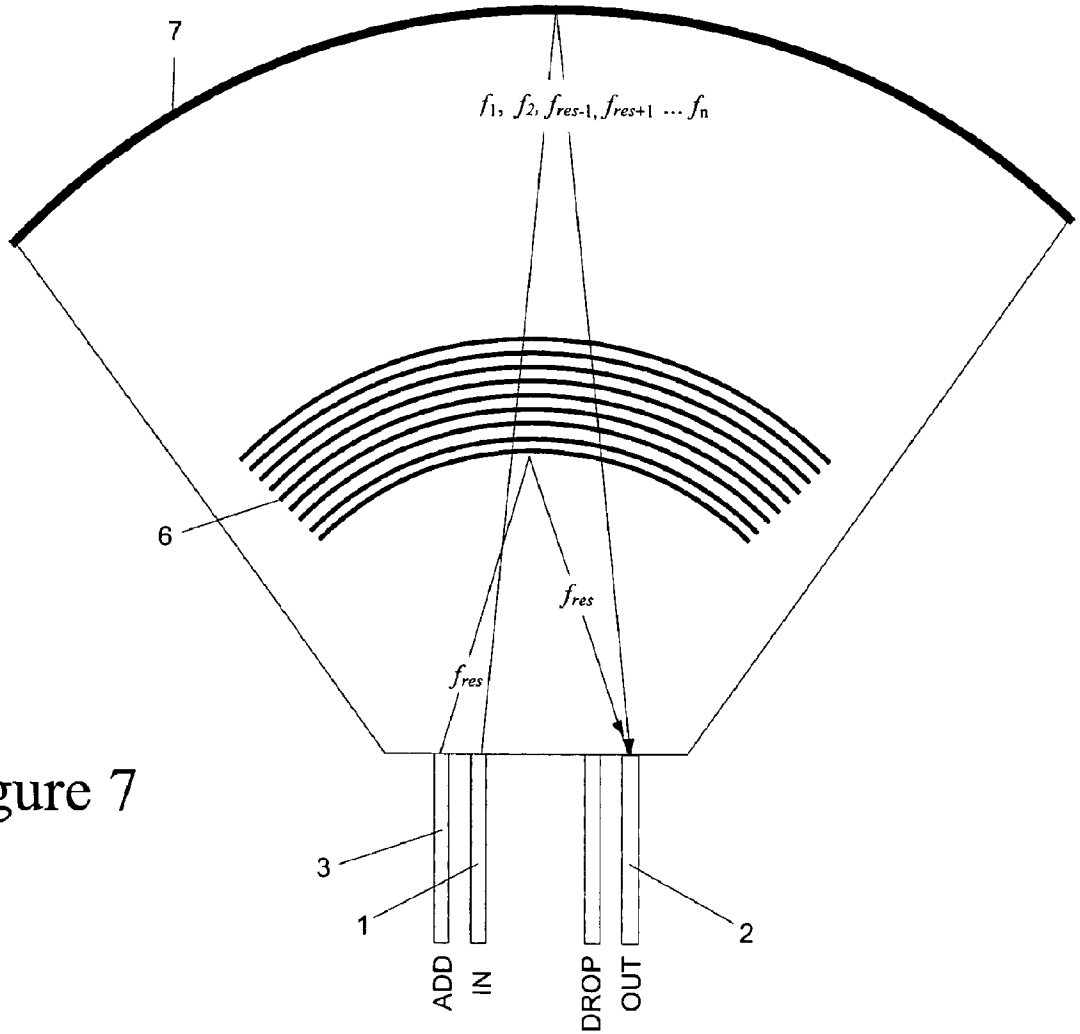
FIG. 7 is a top view of an exemplary optical multiplexing device.

One possible set of beam paths for a dropped optical channel is shown in FIG. 6. The input waveguide (1) produces divergent beam of an optical signal including frequency bands $f_1, f_2 \ldots f_{res-1}, f_{res}, f_{res+1} \ldots f_n$. HOP (6) reflects back that portion of the optical wave within a specific resonance frequency band $f_{res}$ and focuses the reflected light into the drop waveguide (4). The remaining portion of the optical signal in other frequency bands $f_1, f_2 \ldots f_{res-1}, f_{res+1} \ldots f_n$ is transmitted through HOP (6) substantially unaffected, and is reflected and focused by the mirror (7) (may also be referred to as a reflective surface or an output reflector) into the output waveguide (2). One possible set of beam paths for an added optical channel is shown in FIG. 7. For the added channel, an optical signal in the resonance frequency band $f_{res}$ is introduced through the add waveguide (3) and routed by HOP (6) into the output waveguide (2). Optical signals in other bands introduced through the input port (1) are routed by reflector (7) to the output port (4). In an exemplary embodiment of an optical multiplexing device, the frequency bands may correspond to optical channels of a WDM system (a Wavelength Division Multiplexing system). Any other spectral profile for the HOP (6) may be employed for achieving a variety of optical functionality(ies) while remaining within the scope of the present disclosure and/or appended claims.

In the exemplary embodiments HOP's are used as spectral filters and focusing and/or routing elements, while surface reflectors (mirrors) or broadband HOP's may be used as substantially achromatic focusing and/or routing elements. Combination of one or more frequency-selective HOP's and one or more achromatic reflectors (HOP's and/or mirrors), using one or more optical elements, may produce an OADM device of arbitrary complexity and with an arbitrary number of waveguides and/or add/drop frequency bands. Waveguide apertures (i.e., optical ports) may be placed at arbitrary locations of the optical element(s). While so-called relay-imaging may be employed for routing an optical signal among multiple reflectors and/or diffractive element sets, it need not always be the case that each reflector or diffractive element set bring the optical signal to an image or focus within the optical element. Given the occasional appearance of point defects within an optical element, in some instances it may be desirable to avoid such imaging or focusing of the optical signal. In embodiments resembling the schematic exemplary embodiment of FIG. 4 (which includes multiple optical reflectors 114 and 119), it may be desirable under some circumstances to arrange the reflectors to maintain the transverse spatial extent of the optical signal above a certain minimum size while being routed between the reflectors. The minimum size may be twice the transverse extent of the optical signal at the input and/or output ports, for example, or five times the input or output signal size. After entering the input port, the signal would have diverged to larger than the minimum size upon reaching the first reflector. The first reflector may, for example, be arranged for collimating the signal (in the unconfined transverse dimension), so that the transverse extent of the signal remains large while routed to the next reflector, and so on. The last reflector may be arranged to refocus the signal for exiting the optical element through the output port. By maintaining a large transverse size for the optical signal between the reflectors, the impact of point defects in the optical element may be reduced.

Figure 8A:
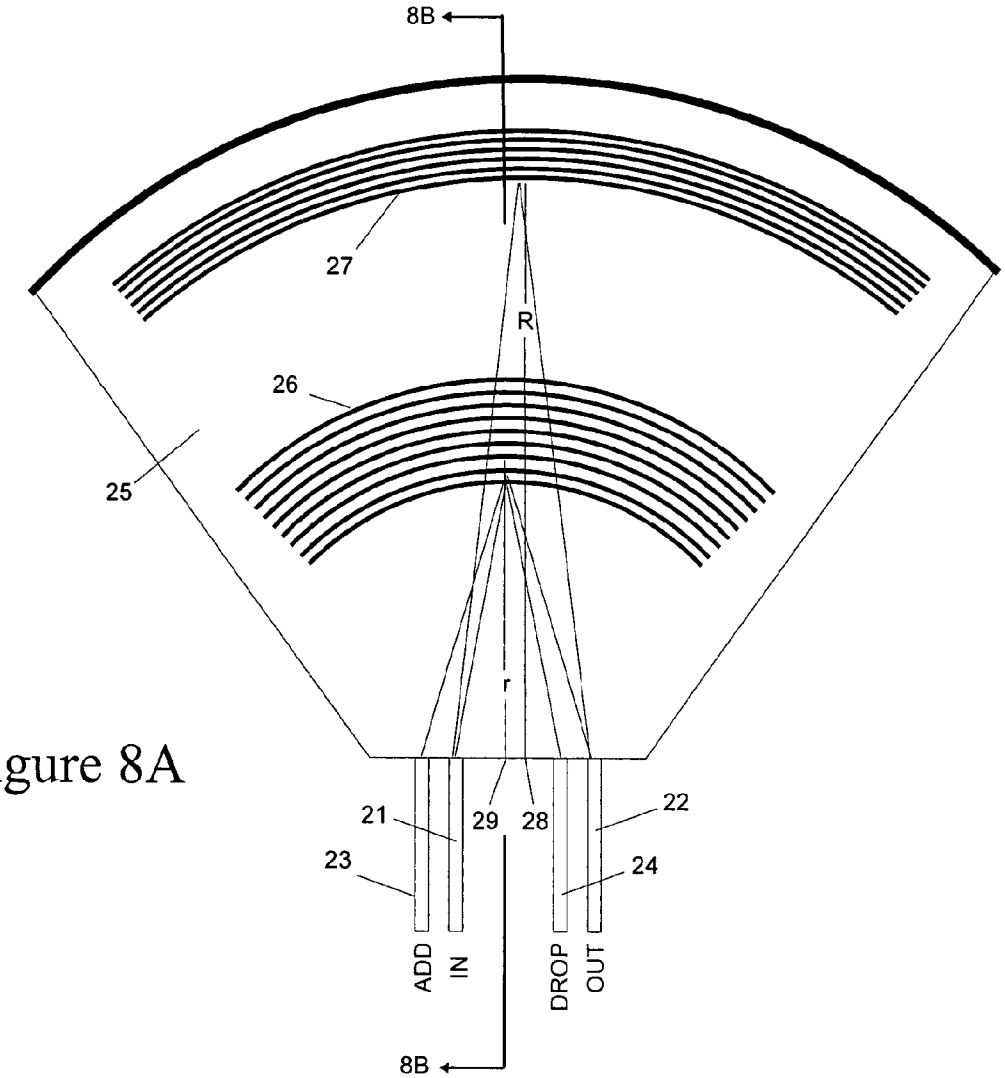
FIGS. 8A and 8B are top and cross-sectional views of an exemplary optical multiplexing device.
Figure 8B:
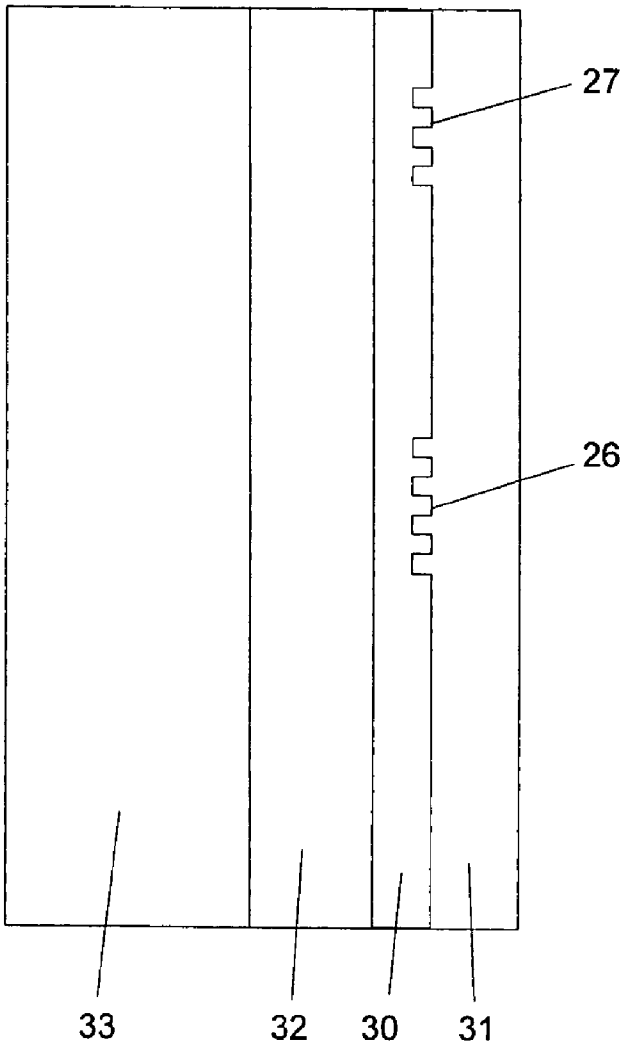

In the exemplary embodiment of FIGS. 8A and 8B, the embodiment of FIGS. 5A and 5B is modified so that the reflecting surface (7) is replaced with a broadband HOP (27). This version of the device comprises an input waveguide (21), an output waveguide (22), an add waveguide (23), and a drop waveguide (24), each edge-coupled to a single-mode or multi-mode slab or planar waveguide (25). Planar waveguide (25) includes a narrow-band or multi-band HOP (26) and a broadband HOP (27), which serves as the optical reflector for routing light between optical ports (21) and (22). The diffractive elements of HOP (26) and HOP (27) are implemented in the shape of circular arcs with common centers of curvature (29) and (28), respectively. The cross-section view in FIG. 8B shows the layer structure of the OADM, in this example comprising at least one core layer (30) between lower cladding layer (32) and upper cladding layer (31), each cladding layer having refractive indices sufficiently different from the core layer to achieve substantial optical confinement. Core and cladding layers are on a substrate (33).

The functionality of HOP (26) is substantially similar to that of HOP (6) in FIG. 5A. The broadband HOP (27) is designed to have a broad resonance reflective band ($f_{min}$, $f_{max}$) and to route light between the aperture of the input waveguide and the aperture of output waveguide. To achieve this, the HOP (27) may comprise substantially concentric circular arcs with square, rectangular, or other lithographically convenient cross-section formed in one or more the layers (30), (31) or (32). To achieve broad reflective bandwidth (i.e., substantially constant over a designed spectral window for the device), the spatial separation of the HOP diffractive contours may be chirped from one side of the HOP to the other. Alternatively, the HOP may be thin. The contour, width, fill factor, and/or other characteristics of the HOP diffractive elements may be optimized (if needed or desired) according to the teachings of U.S. application Ser. No. 10/229,444 (Pub. No. US 2003/0036444 A1) and/or U.S. application Ser. No. 10/653,876, each incorporated hereinabove. HOP apodization of arbitrary complexity may be employed, including without limitation introduction of several broadband or narrowband reflective bands. The center of curvature (28) of diffractive element contours of broadband HOP (27) substantially coincides with the midpoint between the coupling apertures of the input (21) and output (22) waveguides. If insertion loss optimization is desired, the broadband HOP (27) may have such width and location to intersect all or most of the light radiated from the coupling aperture of waveguide (21), and waveguide (22) may be positioned at such an angle to maximize its coupling to the light reflected from the broadband HOP (27).

Figure 9A:
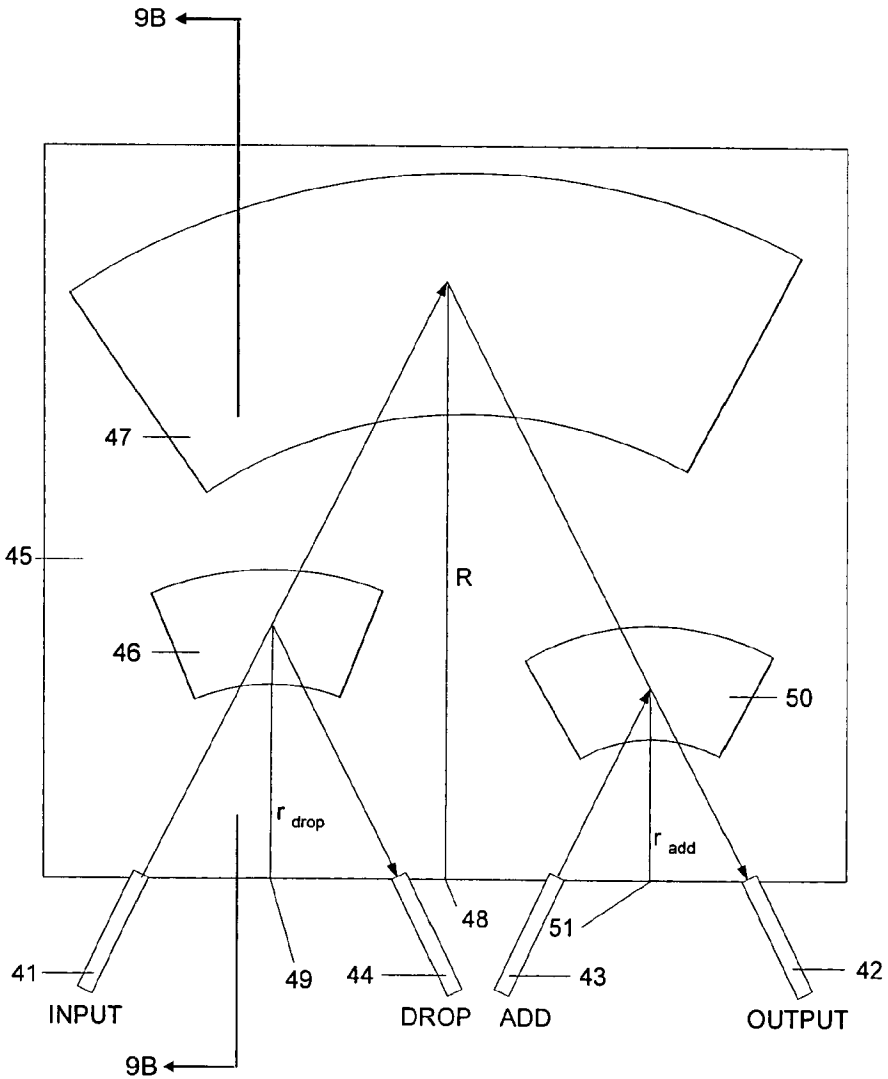
FIGS. 9A and 9B are top and cross-sectional views of an exemplary optical multiplexing device.
Figure 9B:
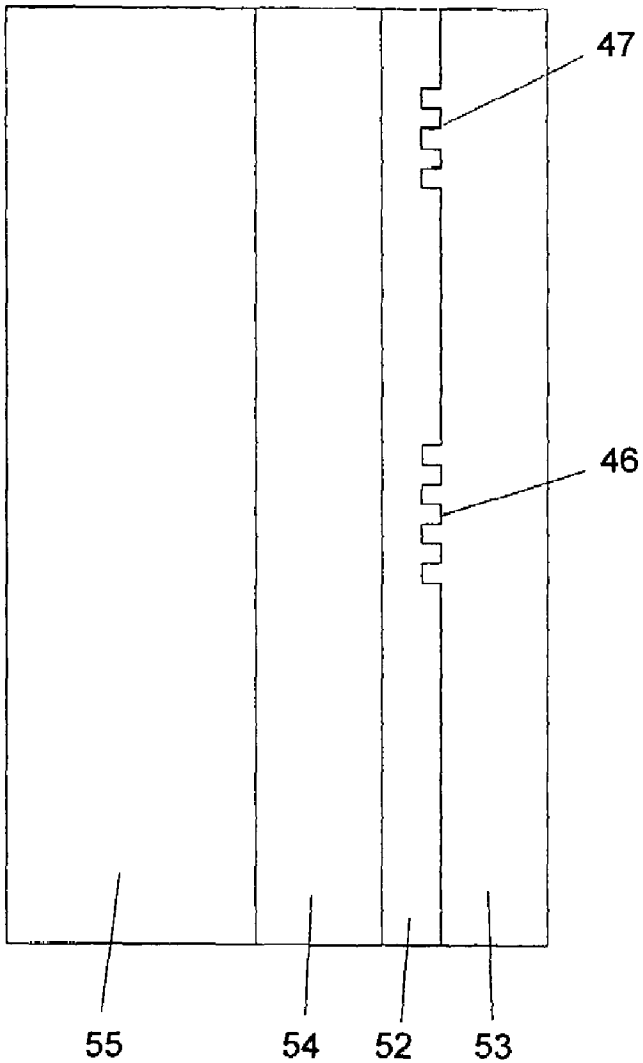

In some cases, it may be convenient to use one narrow or multi-band HOP for the add signal and another narrow or multi-band HOP for the drop signal. Modification of the embodiment of FIGS. 8A and 8B to incorporate this possibility is shown in FIGS. 9A and 9B. The two narrow or multi-band band HOP's are shown to be spatially separate but they may also be overlaid, interleaved, or stacked, and taught in App. No. 60/525,815, referenced hereinabove. The narrowband HOP (46) with center of curvature (49) routes signals within its reflection band(s) between input waveguide (41) and drop waveguide (44). Narrow or multi-band HOP (50) with center of curvature (51) routes signals within its reflection band(s) between add waveguide (43) and output waveguide (42). The rest of the elements and the morphology of the elements is substantially similar to that of the embodiment of FIGS. 8A and 8B, namely, broadband HOP (47) with center of curvature 48 routes signals transmitted by HOP's (46) and (50) between coupling apertures of waveguides (41) and (42). As shown in FIG. 9B, the layer structure of the OADM comprises at least one core layer (52) between lower cladding layer (54) and upper cladding layer (53), each cladding layer having refractive indices sufficiently different from the core layer to achieve substantial optical confinement. Core and cladding layers are on a substrate (55).

As already stated, the two narrow or multi-band HOP's of FIGS. 9A and 9B may have two separate centers of curvature. Resonance frequencies $f_{ADD}$ and $f_{DROP}$ may be designed independently and optical coupling to and from all four waveguides may be independently optimized. As discussed in the incorporated references, general HOP devices (equivalently, photonic bandgap structures or diffractive element sets) comprise holographic type diffractive contours that can be optimized to precisely transform wavefronts incident upon them to output wavefronts optimally matched for entry into desired output ports or for transfer to other HOP's within the optical element for further processing. HOP's based on circular arcs are described here primarily because their routing/imaging properties are easily understood. Optimal HOP's may have contours with profiles customized for providing optimal wavefront transformation in particular applications. Design of such optimized HOP structures is described in the incorporated references. It should be appreciated that optical multiplexing devices falling within the scope of the present disclosure may incorporate HOP structures having contours of any suitable shape, whether fully optimized for port-to-port optical routing or not.

Figure 10A:
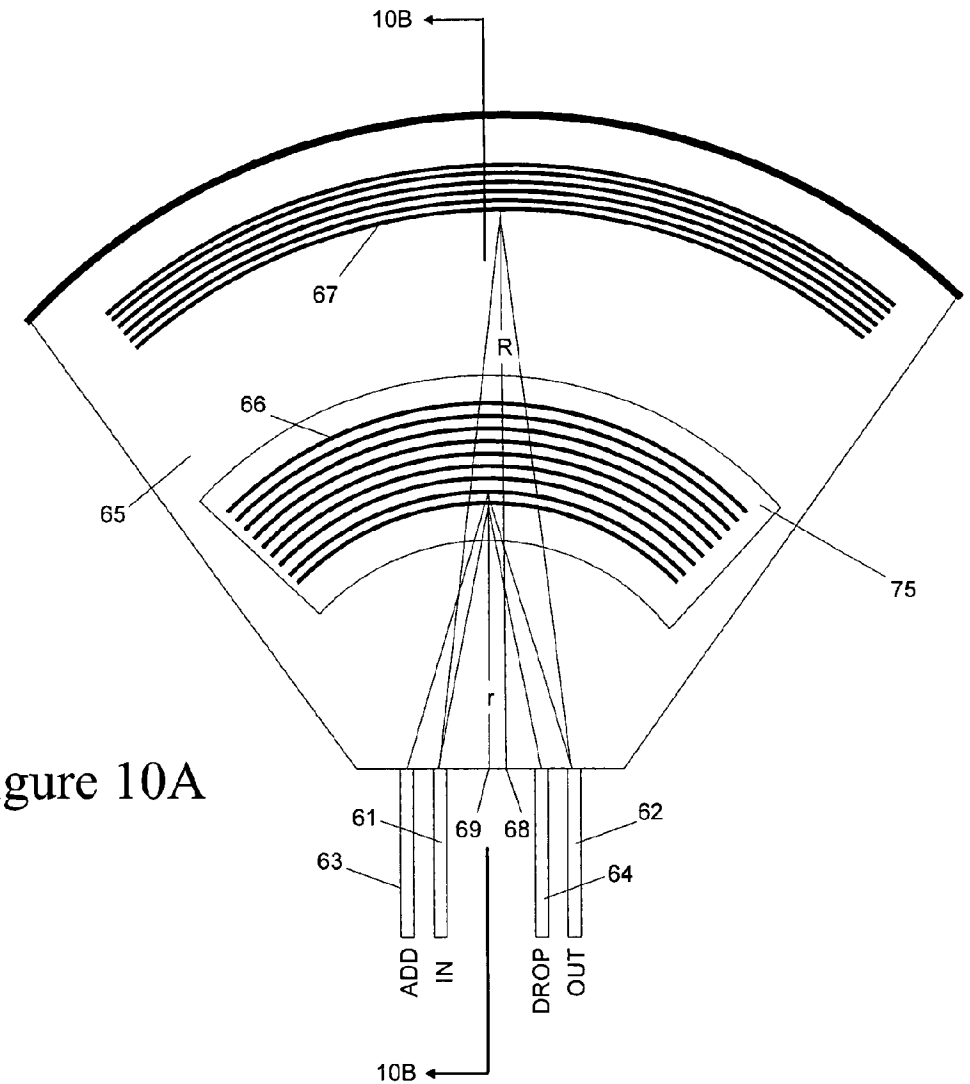
FIGS. 10A and 10B are top and cross-sectional views of an exemplary optical multiplexing device.
Figure 10B:
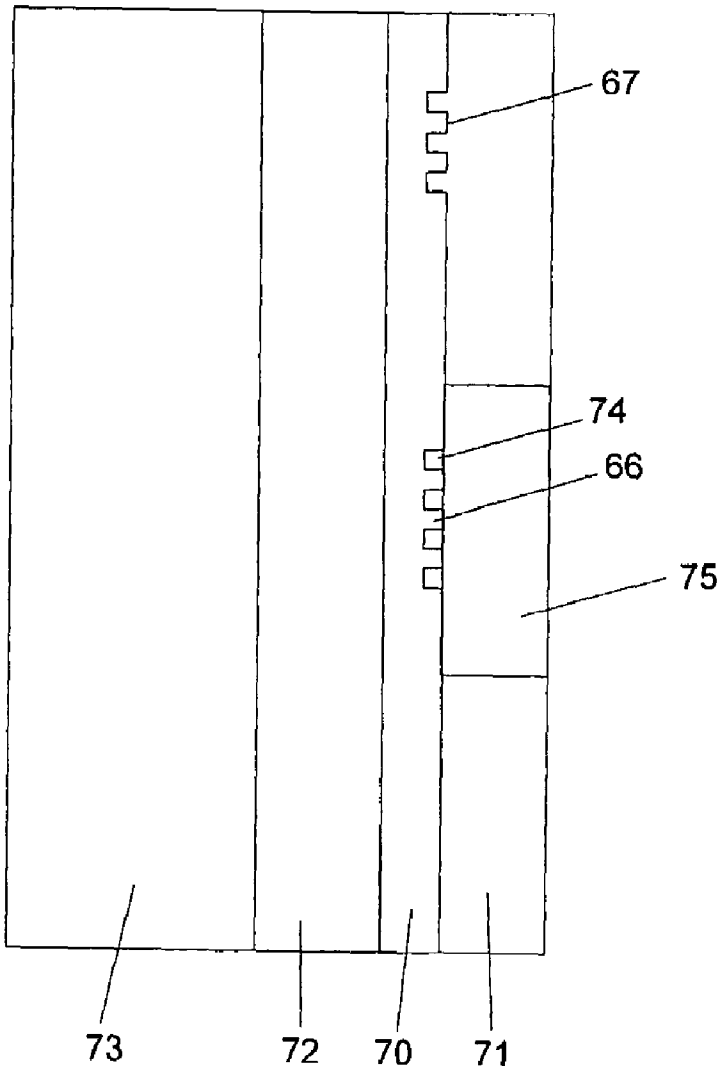

Tunability of the HOP's employed in the multiplexer devices described herein may add useful functionality to the device. Another modification of the embodiment of FIGS. 8A and 8B is shown in FIGS. 10A and 10B. The diffractive elements of narrow-band HOP (66) may be formed as described hereinabove, or by filling grooves etched in the core (70) with material (74) having a refractive index higher than that of the core to provide for tight confinement of the mode in the diffractive element region, or by any other suitable means. The upper cladding (71) above the narrowband HOP (66) is etched and filled with electro-optic polymer (75). The refractive index of the polymer is tuned using the electro-optical effect via electrodes (not shown), resulting in changes in the HOP resonant frequency with the applied voltage. Other aspects of the exemplary embodiment of FIGS. 10A and 10B are substantially similar to those of FIGS. 8A and 8B, namely, input waveguide (61), output waveguide (62), add waveguide (63), drop waveguide (64), planar waveguide (65), narrow or multi-band HOP (66) with center of curvature (69) substantially coinciding with the midpoint between coupling apertures of (63) and (62) and also the midpoint between coupling apertures (61) and (64), broadband HOP (67) with center of curvature (68) substantially coinciding with the midpoint between the coupling apertures of (61) and (62). The layer structure of the OADM, in addition to elements (74) and (75), comprises at least one core layer (70) between lower cladding layer (72) and upper cladding layer (71), each cladding layer having refractive indices sufficiently different than the core to achieve substantial optical confinement. Core and cladding layers are on a substrate (73). Electro-optic material may be incorporated for altering the properties of HOP (66) in many other suitable ways, including but not limited to forming all or parts of one or more of core (70) and cladding layers (71) and (72) from electro-optic material.

Tunability may also be achieved by other means such as application of mechanical stress and controlled changes in HOP temperature. These and other means known in the art to produce controlled changes in optical path length within the HOP structure may be employed to create tunable OADM devices within the scope of the present disclosure and/or appended claims.

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure and/or appended claims.

What is claimed is:

1. An optical apparatus, comprising:

an optical element having at least one set of diffractive elements, *the at least one set of diffractive elements having a resonance frequency band* $f_{res}$; and an *achromatic* optical reflector, wherein:

the reflector routes, between a first optical port and a second optical port, that portion *having frequency bands* $f_1, \ldots f_{res-1}, f_{res+1} \ldots f_n$ of an optical signal propagating within the optical element and transmitted by each diffractive element set;

each diffractive element set routes, between a corresponding multiplexing optical port and either the first or the second optical port, a corresponding portion of the optical signal that is diffracted by the diffractive element set according to a corresponding set transfer function;

and the optical element comprises a planar optical waveguide, the planar optical waveguide substantially confining in one transverse dimension the optical signal propagating in two dimensions therein, and wherein:

(a) the diffractive elements of the set are collectively arranged so as to exhibit a positional variation in amplitude, optical separation, or spatial phase over some portion of the set, said positional variation determining at least in part the set transfer function;

or (b) (1) each diffractive element is spatially arranged relative to a corresponding diffractive element virtual contour and comprises at least one diffracting region thereof, the diffracting regions having at least one altered optical property so as to enable diffraction of a portion of the incident optical field therefrom, (2) each diffractive element diffracts a corresponding diffracted component of an incident optical field with a corresponding diffractive element transfer function so that each diffractive element set collectively provides the corresponding set transfer function between the corresponding multiplexing optical port and either the first or the second optical port, and (3) the corresponding set transfer function or at least one corresponding diffractive element transfer function is determined at least in part by: (A) a less-than-unity fill factor for the corresponding virtual contour, (B) a non-uniform spatial distribution of multiple diffracting regions along the corresponding virtual contour, (C) variation of a spatial profile of the optical property of at least one diffracting region of the corresponding virtual contour, (D) variation of a spatial profile of the optical property among multiple diffracting regions of the corresponding virtual contour, (E) variation of the spatial profile of the optical property of at least one diffracting region among elements of at least one diffractive element set, (F) longitudinal displacement of at least one diffractive element relative to the corresponding virtual contour, or (G) at least one virtual contour lacking a diffractive element corresponding thereto.

2. The apparatus of claim 1, wherein:

the first optical port is an input port;

the second optical port is an output port;

the multiplexing optical port is a dropped-channel port;

the diffractive element set routes the corresponding diffracted portion of the optical signal from the input port to the dropped-channel port; and the apparatus functions as a channel-dropping multiplexer.

3. The apparatus of claim 1, wherein:

the first optical port is an input port;

the second optical port is an output port;

the multiplexing optical port is an added-channel port;

the diffractive element set routes the corresponding diffracted portion of the optical signal from the added-channel port to the output port; and the apparatus functions as a channel-adding multiplexer.

4. The apparatus of claim 1, wherein:

the first optical port is an input port;

the second optical port is an output port;

the multiplexing optical port is a dropped-channel port;

the diffractive element set routes a corresponding diffracted portion of the optical signal from the input port to the dropped-channel port;

the diffractive element set routes a corresponding diffracted portion of the optical signal from an added-channel port to the output port; and the apparatus functions as an add/drop multiplexer.

5. The apparatus of claim 4, further comprising:

a first optical waveguide optically coupled to the input port;

a second optical waveguide optically coupled to the output port;

a third optical waveguide optically coupled to the dropped-channel port; and a fourth optical waveguide optically coupled to the added-channel port, wherein each of the first, second, third, and fourth optical waveguides substantially confines in two transverse dimensions optical signals propagating therethrough.

6. The apparatus of claim 1, wherein the diffractive elements are curvilinear elements.

7. The apparatus of claim 1, wherein the planar optical waveguide supports only a single optical transverse mode in the confined transverse dimension.

8. The apparatus of claim 1, wherein the planar optical waveguide supports multiple optical transverse modes in the confined transverse dimension.

9. The apparatus of claim 1, further comprising:

a first optical waveguide optically coupled to the first optical port;

a second optical waveguide optically coupled to the second optical port; and a third optical waveguide optically coupled to the multiplexing optical port, wherein each of the first, second, and third optical waveguides substantially confines in two transverse dimensions optical signals propagating therethrough.

10. The apparatus of claim 9, wherein the first, second, and third optical waveguides are channel waveguides formed on a waveguide substrate.

11. The apparatus of claim 9, wherein the first, second, and third optical waveguides are optical fibers.

12. The apparatus of claim 1, wherein the reflector is a mirror formed on a portion of a surface of the optical element.

13. The apparatus of claim 12, wherein the reflector comprises a metallic coating formed on the portion of the surface of the optical element.

14. The apparatus of claim 12, wherein the reflector comprises a dielectric coating formed on the portion of the surface of the optical element.

15. The apparatus of claim 12, wherein the optical signal undergoes total internal reflection from the portion of the surface of the optical element.

16. The apparatus of claim 1, wherein the reflector is formed within the optical element.

17. The apparatus of claim 16, wherein the reflector comprises a second set of diffractive elements of the optical element.

18. The apparatus of claim 1, wherein the reflector comprises an optical component separate from the optical element.

19. The apparatus of claim 1, wherein the reflector is substantially achromatic over a designed spectral window for the apparatus.

20. The apparatus of claim 1, wherein the portion of the optical signal routed between the first and second optical ports is transmitted through the diffractive element set twice.

21. An optical apparatus, comprising:

an optical element having at least one set of diffractive elements, *the at least one set of diffractive elements having a resonance frequency band* $f_{res}$; and an *achromatic* optical reflector, wherein:

the reflector routes, between a first optical port and a second optical port, that portion *having frequency bands* $f_1, \ldots f_{res-1}, f_{res+1} \ldots f_n$ of an optical signal propagating within the optical element and transmitted by each diffractive element set;

each diffractive element set routes, between a corresponding multiplexing optical port and either the first or the second optical port, a corresponding portion of the optical signal that is diffracted by the diffractive element set according to a corresponding set transfer function;

and the reflector comprises a focusing reflector, and the first and second optical ports are positioned at respective first and second conjugate image points of the focusing reflector, and wherein:

(a) the diffractive elements of the set are collectively arranged so as to exhibit a positional variation in amplitude, optical separation, or spatial phase over some portion of the set, said positional variation determining at least in part the set transfer function;

or (b) (1) each diffractive element is spatially arranged relative to a corresponding diffractive element virtual contour and comprises at least one diffracting region thereof, the diffracting regions having at least one altered optical property so as to enable diffraction of a portion of the incident optical field therefrom, (2) each diffractive element diffracts a corresponding diffracted component of an incident optical field with a corresponding diffractive element transfer function so that each diffractive element set collectively provides the corresponding set transfer function between the corresponding multiplexing optical port and either the first or the second optical port, and (3) the corresponding set transfer function or at least one corresponding diffractive element transfer function is determined at least in part by: (A) a less-than-unity fill factor for the corresponding virtual contour, (B) a non-uniform spatial distribution of multiple diffracting regions along the corresponding virtual contour, (C) variation of a spatial profile of the optical property of at least one diffracting region of the corresponding virtual contour, (D) variation of a spatial profile of the optical property among multiple diffracting regions of the corresponding virtual contour, (E) variation of the spatial profile of the optical property of at least one diffracting region among elements of at least one diffractive element set, (F) longitudinal displacement of at least one diffractive element relative to the corresponding virtual contour, or (G) at least one virtual contour lacking a diffractive element corresponding thereto.

22. The apparatus of claim 21, wherein the focusing reflector provides a non-unity conjugate image ratio between the first and second conjugate image points.

23. An optical apparatus, comprising:

an optical element having at least one set of diffractive elements, *the at least one set of diffractive elements having a resonance frequency band* $f_{res}$; and an *achromatic* optical reflector, wherein:

the reflector routes, between a first optical port and a second optical port, that portion *having frequency bands* $f_1, \ldots f_{res-1}, f_{res+1} \ldots f_n$ of an optical signal propagating within the optical element and transmitted by each diffractive element set;

each diffractive element set routes, between a corresponding multiplexing optical port and either the first or the second optical port, a corresponding portion of the optical signal that is diffracted by the diffractive element set according to a corresponding set transfer function;

and the diffractive element set comprises a set of focusing diffractive elements, and the corresponding multiplexing optical port and either the first or the second optical port are positioned at respective first and second conjugate image points of the diffractive elements set, and wherein:

(a) the diffractive elements of the set are collectively arranged so as to exhibit a positional variation in amplitude, optical separation, or spatial phase over some portion of the set, said positional variation determining at least in part the set transfer function;

or (b) (1) each diffractive element is spatially arranged relative to a corresponding diffractive element virtual contour and comprises at least one diffracting region thereof, the diffracting regions having at least one altered optical property so as to enable diffraction of a portion of the incident optical field therefrom, (2) each diffractive element diffracts a corresponding diffracted component of an incident optical field with a corresponding diffractive element transfer function so that each diffractive element set collectively provides the corresponding set transfer function between the corresponding multiplexing optical port and either the first or the second optical port, and (3) the corresponding set transfer function or at least one corresponding diffractive element transfer function is determined at least in part by: (A) a less-than-unity fill factor for the corresponding virtual contour, (B) a non-uniform spatial distribution of multiple diffracting regions along the corresponding virtual contour, (C) variation of a spatial profile of the optical property of at least one diffracting region of the corresponding virtual contour, (D) variation of a spatial profile of the optical property among multiple diffracting regions of the corresponding virtual contour, (E) variation of the spatial profile of the optical property of at least one diffracting region among elements of at least one diffractive element set, (F) longitudinal displacement of at least one diffractive element relative to the corresponding virtual contour, or (G) at least one virtual contour lacking a diffractive element corresponding thereto.

24. The apparatus of claim 23, wherein the focusing diffractive elements provide a non-unity conjugate image ratio between the first and second conjugate image points.

25. The apparatus of claim 1, wherein the transmitted and diffracted portions of the optical signal differ spectrally.

26. The apparatus of claim 25, wherein the diffracted portion of the optical signal corresponds to at least one channel of an optical WDM system.

27. The apparatus of claim 1, wherein: the optical element has multiple sets of diffractive elements;

each diffractive element set routes, between a corresponding one of multiple multiplexing optical ports and either the first or the second optical port, a corresponding portion of the optical signal that is diffracted by the diffractive element set; and the reflector routes, between the first optical port and the second optical port, that portion of the optical signal transmitted by the multiple diffractive element sets.

28. The apparatus of claim 27, wherein at least two of the multiple diffractive element sets are overlaid.

29. The apparatus of claim 27, wherein at least two of the multiple diffractive element sets are stacked.

30. The apparatus of claim 27, wherein at least two of the multiple diffractive element sets are interleaved.

31. The apparatus of claim 27, further comprising multiple optical reflectors for routing, between a first optical port and a second optical port, that portion of the optical signal propagating within the optical element and transmitted by the multiple diffractive element sets.

32. The apparatus of claim 31, wherein, during routing between two of the multiple reflectors, a transverse spatial extent of the optical signal in a corresponding unconfined transverse dimension is larger than about two times its transverse spatial extent at the first optical port and larger than about two times its transverse spatial extent at the second optical port.

33. The apparatus of claim 31, wherein, during routing between two of the multiple reflectors, a transverse spatial extent of the optical signal in a corresponding unconfined transverse dimension is larger than about five times its transverse spatial extent at the first optical port and larger than about five times its transverse spatial extent at the second optical port.

34. The apparatus of claim 1, further comprising:

multiple optical elements, each having a corresponding set of diffractive elements; and multiple corresponding optical reflectors, wherein each reflector routes, between a corresponding first optical port and a corresponding second optical port, that portion of an optical signal transmitted by the corresponding diffractive element set;

each corresponding diffractive element set routes, between the corresponding first optical port and a corresponding multiplexing optical port, a corresponding portion of the optical signal that is diffracted by the corresponding diffractive element set; and the multiple optical elements are arranged so that at least one optical port of each of the multiple optical elements is coupled to an optical port of another the multiple optical elements.

35. An optical apparatus, comprising:

diffractive means for routing, between a first optical port and a multiplexing optical port and according to a diffractive transfer function, a corresponding diffracted portion of an optical signal propagating within an optical element, *the diffractive element means having a resonance frequency band* $f_{res}$; and

*achromatic* reflective means for routing, between a first optical port and a second optical port, that portion *having frequency bands* $f_1, \ldots f_{res-1}, f_{res+1} \ldots f_n$ of the optical signal transmitted by the diffractive routing means, wherein the optical element comprises a planar optical waveguide, the planar optical waveguide substantially confining in one transverse dimension the optical signal propagating in two dimensions therein, and wherein:

(a) diffractive elements of the diffractive means are collectively arranged so as to exhibit a positional variation in amplitude, optical separation, or spatial phase over some portion thereof, said positional variation determining at least in part the diffractive transfer function;

or (b) (1) diffractive elements of the diffractive means are each spatially arranged relative to a corresponding diffractive element virtual contour and each comprise at least one diffracting region thereof, the diffracting regions having at least one altered optical property so as to enable diffraction of a portion of the incident optical field therefrom, (2) each diffractive element diffracts a corresponding diffracted component of an incident optical field with a corresponding diffractive element transfer function so that each diffractive element set collectively provides the diffractive transfer function between the multiplexing optical port and either the first or the second optical port, and (3) the diffractive transfer function or at least one corresponding diffractive element transfer function is determined at least in part by: (A) a less-than-unity fill factor for the corresponding virtual contour, (B) a non-uniform spatial distribution of multiple diffracting regions along the corresponding virtual contour, (C) variation of a spatial profile of the optical property of at least one diffracting region of the corresponding virtual contour, (D) variation of a spatial profile of the optical property among multiple diffracting regions of the corresponding virtual contour, (E) variation of the spatial profile of the optical property of at least one diffracting region among elements of at least one diffractive element set, (F) longitudinal displacement of at least one diffractive element relative to the corresponding virtual contour, or (G) at least one virtual contour lacking a diffractive element corresponding thereto.

36. The apparatus of claim 35, wherein the first optical port is an input port, the second optical port is an output port, the multiplexing optical port is a dropped-channel port, and the apparatus functions as a channel-dropping multiplexer.

37. The apparatus of claim 35, wherein the first optical port is an output port, the second optical port is an input port, the multiplexing optical port is an added-channel port, and the apparatus functions as a channel-adding multiplexer.

38. The apparatus of claim 35, wherein the diffractive routing means routes, between the second optical port and a corresponding second multiplexing optical port, a corresponding diffracted portion of the optical signal, the apparatus thereby functioning as an add/drop multiplexer.

39. The apparatus of claim 38, further comprising:

a first optical waveguide optically coupled to the first optical port;

a second optical waveguide optically coupled to the second optical port;

a third optical waveguide optically coupled to the first multiplexing optical port;

a fourth optical waveguide optically coupled to the second multiplexing optical port, wherein each of the first, second, third, and fourth optical waveguides substantially confines in two transverse dimensions optical signals propagating therethrough.

40. The apparatus of claim 35, wherein the diffractive elements are curvilinear elements.

41. The apparatus of claim 35, further comprising:

a first optical waveguide optically coupled to the first optical port;

a second optical waveguide optically coupled to the second optical port; and a third optical waveguide optically coupled to the multiplexing optical port, wherein each of the first, second, and third optical waveguides substantially confines in two transverse dimensions optical signals propagating therethrough.

42. The apparatus of claim 41, wherein the first, second, and third optical waveguides are channel waveguides formed on a waveguide substrate.

43. The apparatus of claim 41, wherein the first, second, and third optical waveguides are optical fibers.

44. The apparatus of claim 35, wherein the reflective routing means is formed on a portion of a surface of the optical element.

45. The apparatus of claim 35, wherein the reflective routing means is formed within the optical element.

46. The apparatus of claim 35, wherein the reflective routing means comprises an optical component separate from the optical element.

47. The apparatus of claim 35, wherein the reflective routing means is substantially achromatic over a designed spectral window for the apparatus.

48. The apparatus of claim 35, wherein the portion of the optical signal routed between the first and second optical ports is transmitted through the diffractive routing means twice.

49. An optical apparatus, comprising:

diffractive means for routing, between a first optical port and a multiplexing optical port and according to a diffractive transfer function, a corresponding diffracted portion of an optical signal propagating within an optical element, *the diffractive element means having a resonance frequency band* $f_{res}$; and

*achromatic* reflective means for routing, between a first optical port and a second optical port, that portion *having frequency bands* $f_1, \ldots f_{res-1}, f_{res+1} \ldots f_n$ of the optical signal transmitted by the diffractive routing means, wherein the reflective routing means acts as a focusing means, and the first and second optical ports are positioned at respective first and second conjugate image points of the focusing means, and wherein:

(a) diffractive elements of the diffractive means are collectively arranged so as to exhibit a positional variation in amplitude, optical separation, or spatial phase over some portion thereof, said positional variation determining at least in part the diffractive transfer function;

or (b) (1) diffractive elements of the diffractive means are each spatially arranged relative to a [coresijonding] *corresponding* diffractive element virtual contour and each comprise at least one diffracting region thereof, the diffracting regions having at least one altered optical property so as to enable diffraction of a portion of the incident optical field therefrom, (2) each diffractive element diffracts a corresponding diffracted component of an incident optical field with a corresponding diffractive element transfer function so that each diffractive element set collectively provides the diffractive transfer function between the multiplexing optical port and either the first or the second optical port, and (3) the diffractive transfer function or at least one corresponding diffractive element transfer function is determined at least in part by: (A) a less-than-unity fill factor for the corresponding virtual contour, (B) a non-uniform spatial distribution of multiple diffracting regions along the corresponding virtual contour, (C) variation of a spatial profile of the optical property of at least one diffracting region of the corresponding virtual contour, (D) variation of a spatial profile of the optical property among multiple diffracting regions of the corresponding virtual contour, (E) variation of the spatial profile of the optical property of at least one diffracting region among elements of at least one diffractive element set, (F) longitudinal displacement of at least one diffractive element relative to the corresponding virtual contour, or (G) at least one virtual contour lacking a diffractive element corresponding thereto.

50. An optical apparatus, comprising:

diffractive means for routing, between a first optical port and a multiplexing optical port and according to a diffractive transfer function, a corresponding diffracted portion of an optical signal propagating within an optical element, *the diffractive element means having a resonance frequency band* $f_{res}$; and

*achromatic* reflective means for routing, between a first optical port and a second optical port, that portion *having frequency bands* $f_1, \ldots f_{res-1}, f_{res+1} \ldots f_n$ of the optical signal transmitted by the diffractive routing means, wherein the diffractive routing means acts as a focusing means, and the first and second optical ports are positioned at respective first and second conjugate image points of the focusing means, and wherein:

(a) diffractive elements of the diffractive means are collectively arranged so as to exhibit a positional variation in amplitude, optical separation, or spatial phase over some portion thereof, said positional variation determining at least in part the diffractive transfer function;

or (b) (1) diffractive elements of the diffractive means are each spatially arranged relative to a [corresijonding] *corresponding* diffractive element virtual contour and each comprise at least one diffracting region thereof, the diffracting regions having at least one altered optical property so as to enable diffraction of a portion of the incident optical field therefrom, (2) each diffractive element diffracts a corresponding diffracted component of an incident optical field with a corresponding diffractive element transfer function so that each diffractive element set collectively provides the diffractive transfer function between the multiplexing optical port and either the first or the second optical port, and (3) the diffractive transfer function or at least one corresponding diffractive element transfer function is determined at least in part by: (A) a less-than-unity fill factor for the corresponding virtual contour, (B) a non-uniform spatial distribution of multiple diffracting regions along the corresponding virtual contour, (C) variation of a spatial profile of the optical property of at least one diffracting region of the corresponding virtual contour, (D) variation of a spatial profile of the optical property among multiple diffracting regions of the corresponding virtual contour, (E) variation of the spatial profile of the optical property of at least one diffracting region among elements of at least one diffractive element set, (F) longitudinal displacement of at least one diffractive element relative to the corresponding virtual contour, or (G) at least one virtual contour lacking a diffractive element corresponding thereto.

51. The apparatus of claim 35, wherein the transmitted and diffracted portions of the optical signal differ spectrally.

52. The apparatus of claim 51, wherein the diffracted portion of the optical signal corresponds to at least one channel of an optical WDM system.

53. The apparatus of claim 35, further comprising multiple diffractive means for routing, between a corresponding one of multiple multiplexing optical ports and either the first or the second optical port, a corresponding portion of the optical signal propagating within the optical element; and the reflective routing means routes, between the first optical port and the second optical port, that portion of the optical signal transmitted by the multiple diffractive element sets.

54. The apparatus of claim 53, wherein at least two of the multiple diffractive means are overlaid.

55. The apparatus of claim 53, wherein at least two of the multiple diffractive means are stacked.

56. The apparatus of claim 53, wherein at least two of the multiple diffractive means are interleaved.

57. The apparatus of claim 53, further comprising multiple reflective means for routing, between a first optical port and a second optical port, that portion of the optical signal propagating within the optical element and transmitted by the multiple diffractive element sets.

58. The apparatus of claim 57, wherein, during routing between two of the multiple reflective means, a transverse spatial extent of the optical signal in a corresponding unconfined transverse dimension is larger than about two times its transverse spatial extent at the first optical port and larger than about two times its transverse spatial extent at the second optical port.

59. The apparatus of claim 57, wherein, during routing between two of the multiple reflective means, a transverse spatial extent of the optical signal in a corresponding unconfined transverse dimension is larger than about five times its transverse spatial extent at the first optical port and larger than about five times its transverse spatial extent at the second optical port.

60. The apparatus of claim 35, further comprising:

multiple diffractive means for routing, between a corresponding first optical port and a corresponding multiplexing optical port, a corresponding diffracted portion of an optical signal propagating within a corresponding one of multiple optical elements; and multiple corresponding reflective means for routing, between the corresponding first optical port and a corresponding second optical port, that portion of the optical signal transmitted by the corresponding diffractive element set, wherein the multiple optical elements are arranged so that the corresponding first and second optical ports are coupled to optical ports of others of the first and second optical ports.

61. The apparatus of claim 21, wherein the optical element enables propagation of the optical signal in three dimensions.

62. The apparatus of claim 23, wherein the optical element enables propagation of the optical signal in three dimensions.

63. The apparatus of claim 49, wherein the optical element enables propagation of the optical signal in three dimensions.

64. The apparatus of claim 50, wherein the optical element enables propagation of the optical signal in three dimensions.

*65. An optical apparatus, comprising:*

*an optical element having at least one set of diffractive elements; and*

*an optical reflector having a reflective surface coating and spatially separated from said at least one set of diffractive elements,*

*wherein:*

*the optical reflector is configured to route, between a first optical port and a second optical port, at least a first portion of an optical signal that propagates within the optical element;*

*each diffractive element set is configured to route, between at least a third optical port and either the first or the second optical ports, a second portion of the optical signal that is respectively diffracted by each diffractive element set according to a corresponding set transfer function;*

*the optical element includes a planar optical waveguide, the planar optical waveguide being configured to substantially to confine in one transverse dimension the optical signal propagating in two dimensions therein; and*

*(a) the diffractive elements of the at least one set are collectively arranged so as to exhibit a positional variation in amplitude, optical separation, or spatial phase over some portion of the at least one set, said positional variation determining at least in part the set transfer function;*

*or*

*(b) (1) each diffractive element is spatially arranged relative to a corresponding diffractive element virtual contour and includes at least one diffracting region thereof, the diffracting regions having at least one altered optical property so as to enable diffraction of a portion of an incident optical field therefrom,*

*(2) each diffractive element diffracts a corresponding diffracted component of the incident optical field with a corresponding diffractive element transfer function so that each diffractive element set collectively provides the corresponding set transfer function between the at least the third optical port and either the first or the second optical ports, and*

*(3) the corresponding set transfer function or at least one corresponding diffractive element transfer function is determined at least in part by: (A) a less-than-unity fill factor for the corresponding virtual contour, (B) a non-uniform spatial distribution of multiple diffracting regions along the corresponding virtual contour, (C) variation of a spatial profile of the optical property of at least one diffracting region of the corresponding virtual contour, (D) variation of a spatial profile of the optical property among multiple diffracting regions of the corresponding virtual contour, (E) variation of the spatial profile of the optical property of at least one diffracting region among elements of one or more diffractive element sets, (F) longitudinal displacement of at least one diffractive element relative to the corresponding virtual contour, or (G) at least one virtual contour lacking a diffractive element corresponding thereto.*

*66. The optical apparatus of claim 65 wherein said at least the first portion of the optical signal routed by the optical reflector has been respectively transmitted by each diffractive element set.*

*67. The optical apparatus of claim 65 wherein the optical reflector includes a focusing reflector, and wherein the first and second optical ports are positioned at respective first and second conjugate image points of the focusing reflector.*

*68. The optical apparatus of claim 65 wherein the set of diffractive elements includes a set of focusing diffractive elements, and wherein said at least the third optical port and either the first or second optical ports are positioned at respective first and second conjugate image points of the set.*

*69. The optical apparatus of claim 65 wherein:*

*the first optical port includes an input port;*

*the second optical port includes an output port; and*

*the at least the third port includes an added-channel port or a dropped-channel port.*

*70. A method of operating an optical apparatus having an optical element, at least one set of diffractive elements, and an optical reflector, the method comprising:*

*receiving, by the optical element, an optical signal;*

*routing, by the optical reflector which has a reflective surface coating and which is spatially separated from said at least one set of diffractive elements, between a first optical port and a second optical port, at least a first portion of the optical signal that propagates within the optical element; and*

*routing, between at least a third optical port and either the first or the second optical ports, a second portion of the optical signal that is respectively diffracted by each diffractive element set according to a corresponding set transfer function,*

*wherein:*

*the optical element includes a planar optical waveguide, the planar optical waveguide being configured to substantially to confine in one transverse dimension the optical signal propagating in two dimensions therein; and*

*(a) the diffractive elements of the at least one set are collectively arranged so as to exhibit a positional variation in amplitude, optical separation, or spatial phase over some portion of the at least one set, said positional variation determining at least in part the set transfer function;*

*or*

*(b) (1) each diffractive element is spatially arranged relative to a corresponding diffractive element virtual contour and includes at least one diffracting region thereof, the diffracting regions having at least one altered optical property so as to enable diffraction of a portion of an incident optical field therefrom,*

*(2) each diffractive element diffracts a corresponding diffracted component of the incident optical field with a corresponding diffractive element transfer function so that each diffractive element set collectively provides the corresponding set transfer function between the at least the third optical port and either the first or the second optical ports, and*

(3) *the corresponding set transfer function or at least one corresponding diffractive element transfer function is determined at least in part by:* (*A*) *a less-than-unity fill factor for the corresponding virtual contour,* (*B*) *a non-uniform spatial distribution of multiple diffracting regions along the corresponding virtual contour,* (*C*) *variation of a spatial profile of the optical property of at least one diffracting region of the corresponding virtual contour,* (*D*) *variation of a spatial profile of the optical property among multiple diffracting regions of the corresponding virtual contour,* (*E*) *variation of the spatial profile of the optical property of at least one diffracting region among elements of one or more diffractive element sets,* (*F*) *longitudinal displacement of at least one diffractive element relative to the corresponding virtual contour, or* (*G*) *at least one virtual contour lacking a diffractive element corresponding thereto.*

*71. The method of claim 70 wherein said routing, between at least the third optical port and either the first or the second optical ports, is part of a channel-dropping operation.*

*72. The method of claim 70 wherein said routing, between at least the third optical port and either the first or the second optical ports, is part of a channel-adding operation.*

*73. The method of claim 70 wherein said at least the first portion of the optical signal routed by the optical reflector has been respectively transmitted by each diffractive element set.*

* * * * *

UNITED STATES PATENT AND TRADEMARK OFFICE

CERTIFICATE OF CORRECTION

PATENT NO. : RE43,226 E
APPLICATION NO. : 12/474875
DATED : March 6, 2012
INVENTOR(S) : Iazikov et al.

It is certified that error appears in the above-identified patent and that said Letters Patent is hereby corrected as shown below:

Page 2, item (56), under "Foreign Patent Documents", in Column 1, Line 1,
delete "GB 2 68 215 A 6/1986
GB 2168215 A1 6/1986"
and insert -- GB 2168215 A1 6/1986 --.

Page 2, item (56), under "Other Publications", in Column 2, Line 10, delete "TechnologyLetters" and insert -- Technology Letters --.

Page 2, item (56), under "Other Publications", in Column 2, Line 29, delete "Ligthwave" and insert -- Lightwave --.

Page 2, item (56), under "Other Publications", in Column 2, Line 51, delete "Couples" and insert -- Couplers --.

Page 3, item (56), under "Other Publications", in Column 1, Line 44, delete "Accoustical" and insert -- Acoustical --.

Page 3, item (56), under "Other Publications", in Column 2, Line 27, delete "Aug. 24, 004." and insert -- Aug. 24, 2004. --.

Page 3, item (56), under "Other Publications", in Column 2, Line 29, delete "ctlindrical" and insert -- cylindrical --.

Column 1, lines 11-12, delete "prior-filed co-pending provisional" and insert -- prior-filed provisional --.

Column 16, line 49, in Claim 34, delete "wherein" and insert -- wherein: --.

Signed and Sealed this
Fourth Day of September, 2012

David J. Kappos

David J. Kappos
*Director of the United States Patent and Trademark Office*

Column 16, lines 61-62, in Claim 34, delete “coupled to an optical port of another the multiple optical elements” and insert -- coupled to an optical port of another of the multiple optical elements --.

Column 21, lines 34-35, in Claim 65, delete “the planar optical waveguide being configured to substantially to confine” and insert -- the planar optical waveguide being configured to substantially confine --.

Column 22, lines 44-45, in Claim 70, delete “the planar optical waveguide being configured to substantially to confine” and insert -- the planar optical waveguide being configured to substantially confine --.